c

(12) United States Patent
Tsunashima

(10) Patent No.: US 11,044,463 B2
(45) Date of Patent: Jun. 22, 2021

(54) IMAGE PROCESSING DEVICE AND IMAGE PROCESSING METHOD

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/623,851

(22) PCT Filed: Jun. 13, 2018

(86) PCT No.: PCT/JP2018/022523
§ 371 (c)(1),
(2) Date: Dec. 18, 2019

(87) PCT Pub. No.: WO2019/003910
PCT Pub. Date: Jan. 3, 2019

(65) Prior Publication Data
US 2020/0137379 A1     Apr. 30, 2020

(30) Foreign Application Priority Data

Jun. 27, 2017   (JP) .............................. JP2017-125244

(51) Int. Cl.
*H04N 13/363*     (2018.01)
*G06T 7/593*      (2017.01)
(Continued)

(52) U.S. Cl.
CPC ........... *H04N 13/363* (2018.05); *G06T 3/005* (2013.01); *G06T 7/593* (2017.01); *H04N 13/302* (2018.05);
(Continued)

(58) Field of Classification Search
None
See application file for complete search history.

(56) References Cited

U.S. PATENT DOCUMENTS 7,307,655 B1 * 12/2007 Okamoto ........... G06K 9/00791
                                                  348/222.1
8,295,587 B2 * 10/2012 Aoyama ................. G06T 5/006
                                                   382/154
(Continued)

FOREIGN PATENT DOCUMENTS

JP        05-114099 A     5/1993
JP        2008-102620 A   5/2008

OTHER PUBLICATIONS

Naruse, et al., "3D Measurement of Objects in Water Using Fish-eye Stereo Camera", Journal of the Japan Society for Precision Engineering (JSPE), vol. 79, No. 4, 2013, pp. 344-348.
(Continued)

*Primary Examiner* — Chikaodili E Anyikire
(74) *Attorney, Agent, or Firm* — Chip Law Group

(57) ABSTRACT

Provided is an image processing device that acquires a stereo image captured by a plurality of cameras each including a wide-angle lens, divides viewing angles of the cameras with reference to optical axes corrected to be parallel to each other, generates a plurality of base images in each of which a range of each divided viewing angle is reflected and a plurality of reference images on a basis of wide-angle images constituting the stereo image, applies projective transformation to the reference images, and calculates a distance to a predetermined object on a basis of corresponding image pairs of the plurality of base images and the plurality of reference images after projective transformation.

9 Claims, 23 Drawing Sheets

(51) Int. Cl.
*H04N 13/302* (2018.01)
*G06T 3/00* (2006.01)

(52) U.S. Cl.
CPC ............ *G06T 2207/10012* (2013.01); *G06T 2207/10028* (2013.01)

(56) References Cited

U.S. PATENT DOCUMENTS

| | | | | |
|---|---|---|---|---|
| 10,183,621 | B2* | 1/2019 | Hodohara | B60R 1/00 |
| 2013/0300828 | A1* | 11/2013 | Yamato | H04N 13/144 |
| | | | | 348/44 |
| 2018/0365859 | A1* | 12/2018 | Oba | B60W 40/114 |

OTHER PUBLICATIONS

Kano, et al., "An Implementation of Camera Geometry Correction Capability in a Video-Rate Stereo Machine", Journal of the Robotics Society of Japan, vol. 16, No. 4, May 1998, pp. 528-532.
Takeuchi, et al., "Aurora 3d-measurement from Whole-Sky Time Series Image using Fish-eye Stereo Camera", The Japan Society of Mechanical Engineers, vol. 82, No. 834, 2016, 17 pages.
International Search Report and Written Opinion of PCT Application No. PCT/JP2018/022523, dated Sep. 18, 2018, 06 pages of ISRWO.
Kano, et al., "An Implementation of Camera Geometry Correction Capability in a Video-Rate Stereo Machine", Journal of the Robotics Society of Japan, vol. 16, No. 4, Jan. 1998, pp. 527-532.
Naruse, et al., "3D Measurement of Objects in Water Using Fish-eye Stereo Camera", Journal of the Japan Society for Precision Engineering, vol. 79, No. 4, Jan. 2013, pp. 344-348.
Takeuchi, et al., "Aurora 3D-Measurement from Whole-Sky Time Series Image using Fish-eye Stereo Camera", Frontier of Robotics Research in 20th Robotics Symposia, vol. 82, No. 834, 2016, 17 pages.

* cited by examiner

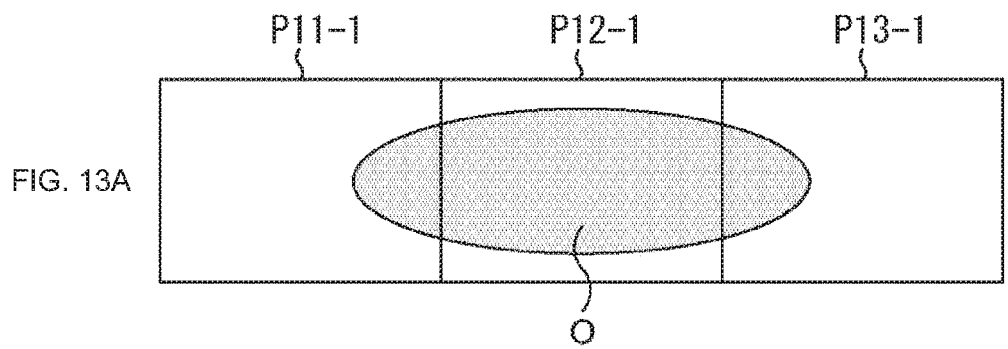
FIG. 13A
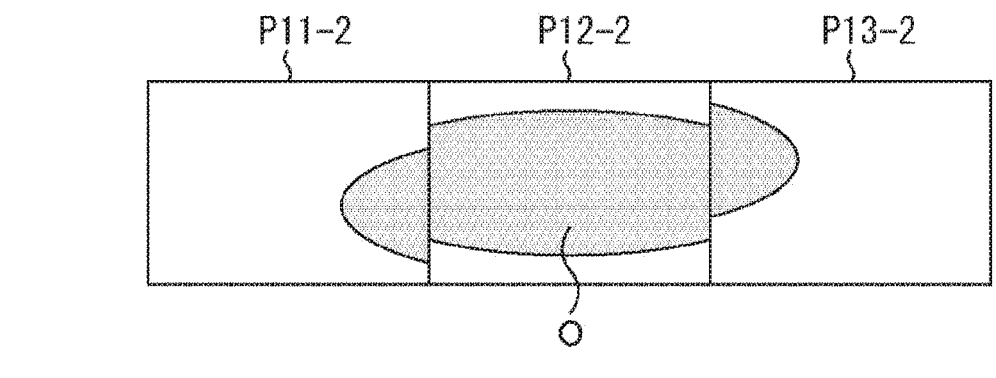
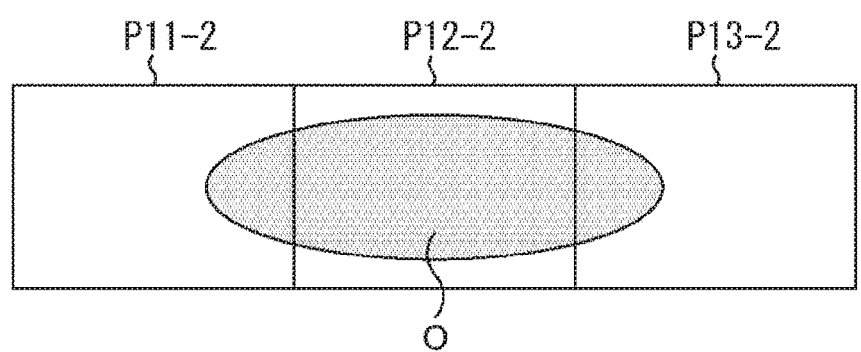
FIG. 13B

IMAGE PROCESSING DEVICE AND IMAGE PROCESSING METHOD

CROSS REFERENCE TO RELATED APPLICATIONS

This application is a U.S. National Phase of International Patent Application No. PCT/JP2018/022523 filed on Jun. 13, 2018, which claims priority benefit of Japanese Patent Application No. JP 2017-125244 filed in the Japan Patent Office on Jun. 27, 2017. Each of the above-referenced applications is hereby incorporated herein by reference in its entirety.

TECHNICAL FIELD

The present technology relates to an image processing device, an image processing method, and a program, and in particular to an image processing device, an image processing method, and a program that enable more accurate rectification of a stereo image captured by a plurality of wide-angle cameras.

BACKGROUND ART

As a system for measuring a distance to an object that exists in a three-dimensional space, there is a stereo camera system that measures the distance from images captured by two (or more) cameras using the triangulation principle (Patent Document 1).

In such a stereo camera system, in a case where the positional relationship between the plurality of cameras deviates from a designed value, the captured image is distorted and the distance cannot be accurately measured. Therefore, a technique called rectification has been developed as a technique for electronically correcting a captured image (Non-Patent Document 1).

By the way, with the recent progress in the semiconductor technology, the number of pixels of an image that can be captured with a digital camera is increasing. Therefore, a camera (hereinafter referred to as a fisheye camera) equipped with a lens such as a fisheye lens that can capture a wide range can obtain sufficient resolution, and a stereo camera system using a fisheye camera has become practical (Non-Patent Document 2).

The conventional rectification in a stereo camera system using a fisheye camera expands rectification in a case of using a camera with a lens with a narrow angle of view, and is performed by projecting an image of one fisheye camera onto one plane (Non-Patent Document 3).

CITATION LIST

Patent Document

Patent Document 1: Japanese Patent Application Laid-Open No. 05-114099

Non-Patent Document

Non-Patent Document 1: "Implementation of Camera Geometry Correction Capability in Video-Rate Stereo Machine", Hiroshi Kano, Shigeru Kimura, Masaya Tanaka, Takeo Kanade, Journal of The Robotics Society of Japan, Vol. 16, No. 4, pp. 527-532, 1998

Non-Patent Document 2: "Aurora 3D-Measurement from Whole-sky Time Series Image Using Fish-eye Stereo Camera", Akira Takeuchi, Hiromitsu Fujii, Atsushi Yamashita, Masayuki Tanaka, Ryuho Kataoka, Yoshizumi Miyoshi, Masatoshi Okutomi, Hajime Asama, Collected Works of The Japan Society of Mechanical Engineers, Vol. 82 (2016), No. 834, pp. 15-00428-1-17, February, 2016

Non-Patent Document 3: "3D Measurement of Objects in Water Using Fish-eye Stereo Camera", Tatsuya Naruse, Atsushi Yamashita, Toru Kaneko, Yuichi Kobayashi, Journal of The Japan Society for Precision Engineering, Vol. 79, (2013) No. 4, pp. 344-348

SUMMARY OF THE INVENTION

Problems to be Solved by the Invention

In the case of projecting an image of a fisheye camera onto one plane, the projected angle of view becomes a part of a capture range of the fisheye camera, and the rectification cannot be accurately performed.

The present technology has been made in view of such a situation, and enables more accurate rectification of a stereo image captured by a plurality of wide-angle cameras.

Solutions to Problems

An image processing device according to one aspect of the present technology includes an acquisition unit configured to acquire a stereo image captured by a plurality of cameras each including a wide-angle lens; a generation unit configured to divide viewing angles of the cameras with reference to optical axes corrected to be parallel to each other and generate a plurality of base images in each of which a range of each divided viewing angle is reflected and a plurality of reference images on the basis of wide-angle images constituting the stereo image; a projective transformation unit configured to apply projective transformation to the reference images; and a distance calculation unit configured to calculate a distance to a predetermined object on the basis of corresponding image pairs of the plurality of base images and the plurality of reference images after projective transformation.

A projection unit configured to project a first wide-angle image and a second wide-angle image constituting the stereo image onto virtual spherical surfaces including the viewing angles of the cameras, respectively can be further provided. In this case, the generation unit can be caused to reproject the first wide-angle image projected onto the virtual spherical surface onto a plurality of planes on the virtual spherical surface to generate the plurality of base images, and to reproject the second wide-angle image projected onto the virtual spherical surface onto a plurality of planes on the virtual spherical surface to generate the plurality of reference images.

A correction unit configured to correct the optical axis on the basis of the stereo image in which a known object is reflected, and a storage unit configured to store information regarding the optical axis after correction can be further provided.

A parameter generation unit configured to generate a parameter to be used for projective transformation on the basis of corresponding points of the base image and the reference image constituting the image pair can be further provided. In this case, the storage unit can be caused to further store the parameter.

The correction unit can be caused to set the optical axis after correction on the basis of information stored in the storage unit, and the projective transformation unit can be caused to perform the projective transformation of the reference image on the basis of the parameter stored in the storage unit.

The correction unit can be caused to repeatedly perform the correction of the optical axis until a correction error becomes equal to or less than a threshold.

The acquisition unit can be caused to acquire wide-angle images captured by two of the cameras as the stereo image.

A plurality of the cameras can be further provided.

In one aspect of the present technology, the stereo image captured by the plurality of cameras each including a wide-angle lens is acquired, and viewing angles of the cameras are divided with reference to optical axes corrected to be parallel to each other. Furthermore, the plurality of base images in which ranges of divided viewing angles are reflected and the plurality of reference images are generated on the basis of the wide-angle images constituting the stereo image, the projective transformation is applied to the reference images, and the distance to the predetermined object is calculated on the basis of the image pairs of the plurality of base images and the plurality of reference images after projective transformation.

Effects of the Invention

According to the present technology, rectification of a stereo image captured by a plurality of wide-angle cameras can be more accurately performed.

Note that effects described here are not necessarily limited, and any of effects described in the present disclosure may be exhibited.

BRIEF DESCRIPTION OF DRAWINGS

FIGS. 13A and 13B are diagrams illustrating an example of projective transformation.

MODE FOR CARRYING OUT THE INVENTION

Hereinafter, modes for carrying out the present technology will be described. Description will be given in the following order.

1. First Embodiment
2. Second Embodiment
3. Third Embodiment
4. Modification
5. Application 1
6. Application 2

1. First Embodiment

<1-1. Stereo Camera System>

Figure 1:
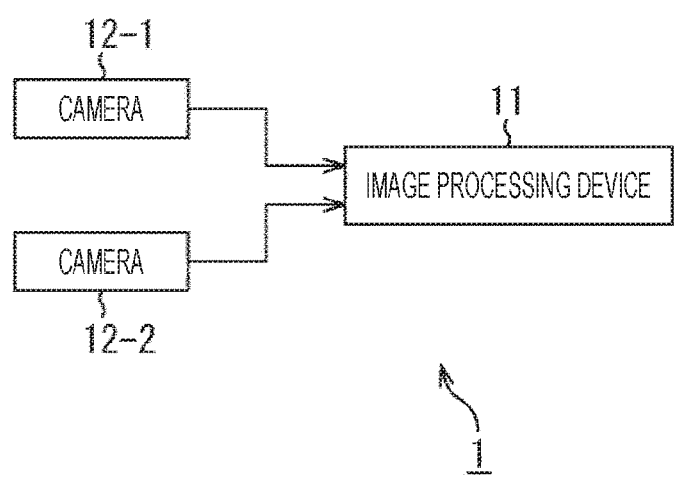
FIG. 1 is a block diagram illustrating a configuration example of a stereo camera system according to an embodiment of the present technology.

FIG. 1 is a block diagram illustrating a configuration example of a stereo camera system according to an embodiment of the present technology.

A stereo camera system 1 illustrated in FIG. 1 is configured by connecting a camera 12-1 and a camera 12-2 constituting a stereo camera to an image processing device 11.

The camera 12-1 and the camera 12-2 are fixed with optical axes in the same direction in a horizontal direction or a vertical direction with a predetermined interval, and are provided with lenses having the same viewing angle.

The camera 12-1 and the camera 12-2 capture images at the same timing and output the captured images. The image captured by the camera 12-1 and the image captured by the camera 12-2 are input to the image processing device 11 as a stereo image. The stereo image input to the image processing device 11 is used to calculate a distance to an object reflected in the stereo image.

Figure 2:
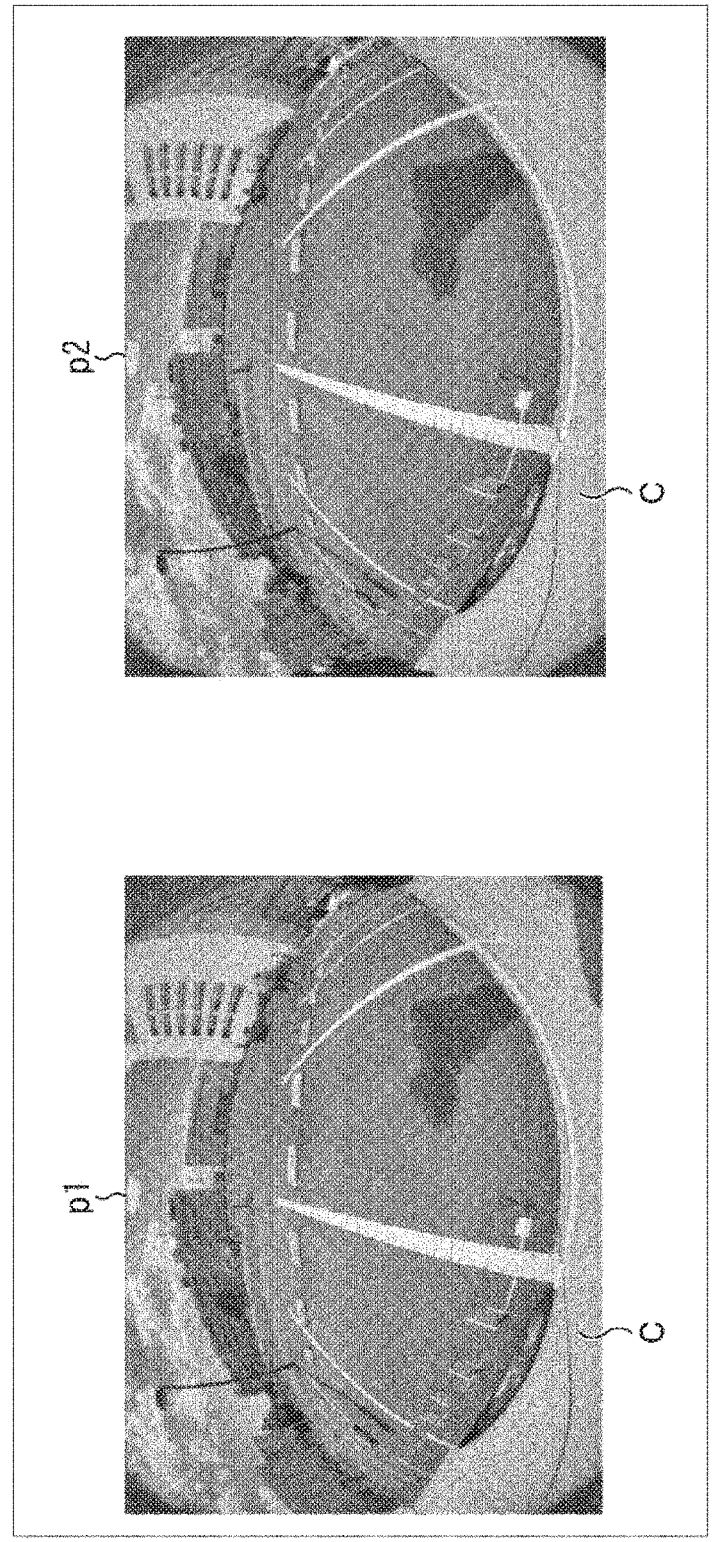
FIG. 2 is a diagram illustrating an example of a stereo image.

FIG. 2 is a diagram illustrating an example of a stereo image input to the image processing device 11.

A captured image p1 and a captured image p2 are wide-angle images captured by the cameras 12-1 and 12-2 having lenses with a wide viewing angle (wide angle of view) such as a fisheye lens. Here, the wide-angle image refers to an image having an angle of view of 120 degrees or more, particularly 150 degrees or more.

Hereinafter, description will be given on the assumption that the cameras 12-1 and 12-2 are fisheye cameras equipped with fisheye lenses. The fisheye lens is a lens having an angle of view of approximately 180 degrees. The case of using two fisheye cameras will be described. However, the number of fisheye cameras used for capturing a stereo image may be two or more.

As illustrated in FIG. 2, the captured image p1 and the captured image p2 are images in which a larger distortion is generated in a peripheral portion. In lower portions of the captured image p1 and the captured image p2, a vehicle body C of an automobile to which the cameras 12-1 and 12-2 are attached is reflected in a substantially arcuate shape.

In other words, the stereo camera system 1 in FIG. 1 is, for example, an on-board system, and is used for calculating the distance to the object during traveling. The calculated distance is used for presenting various types of information such as a warning to a driver.

<1-2. Principle of Distance Calculation>

Figure 3:
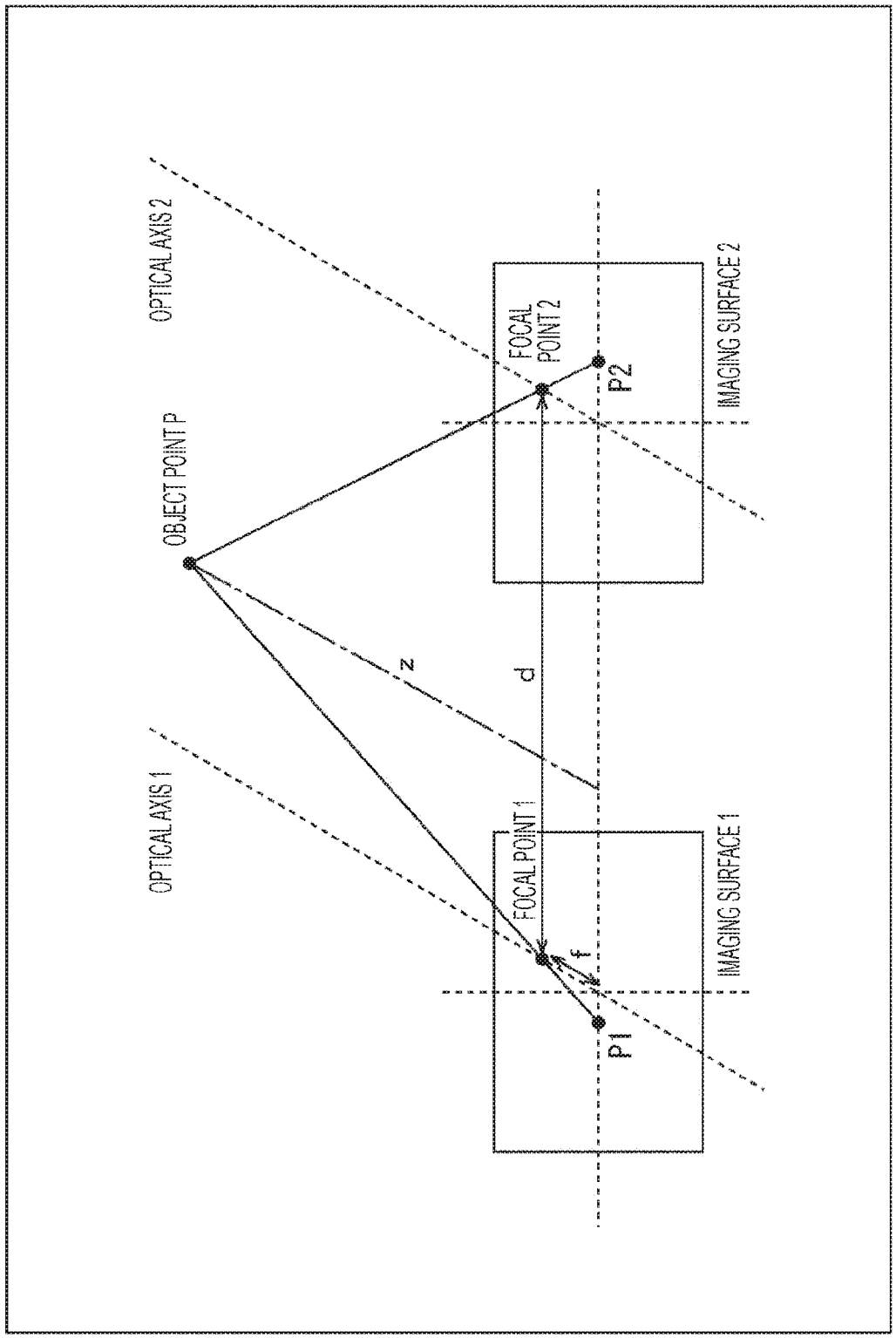
FIG. 3 is a diagram illustrating a principle of distance calculation.

FIG. 3 is a diagram illustrating a principle of distance calculation to an object.

In the stereo camera system 1, as illustrated in FIG. 3, imaging surfaces of the two fisheye cameras are arranged in parallel, and the distance to the target object is calculated using the stereo image captured by these imaging surfaces. For example, an imaging surface 1 illustrated on the left side in FIG. 3 is the imaging surface of the camera 12-1, and an imaging surface 2 illustrated on the right side is the imaging surface of the camera 12-2.

It is assumed that an object point P at a position (X, Y, Z) in a three-dimensional space is reflected at a point P1 (x1, y1) on the imaging surface 1, and is reflected at a point P2 (x2, y2) on the imaging surface 2. A distance Z to the object point P is obtained by the following expression (1), where the distance between a center of the imaging surface 1 and a center of the imaging surface 2 is D and a focal length of the fisheye lenses is f.

[Math. 1]

$$Z = D \cdot f/(x1-x2) \quad (1)$$

Since the distance D and the focal length f are fixed values determined by the stereo camera system 1, the distance to the object point can be calculated by obtaining the values of x1 and x2. x1 and x2 are called corresponding points between two images, and obtaining the corresponding point is generally called corresponding point search. Furthermore, x1−x2 in the right side denominator of the above expression (1) is the amount of deviation of the positions of the object in the images and is called parallax.

The corresponding point search is processing of using one of two captured images as a base image and using the other one as a reference image, and searching for where in the reference image a certain point in the base image exists. The search for the corresponding points is performed by image processing such as block matching.

By block matching, a region most similar to the point in the base image and a peripheral region of the point is detected from the reference image. Whether or not a region is similar is quantified by an evaluation expression, and a region having the largest (or smallest) evaluation value is detected as the corresponding point.

As the evaluation value of the block matching, there is a sum of difference absolute values. A sum of difference absolute values E12 is an evaluation value based on luminance differences of the point P1 (x1, y1) and the point P2 (x2, y2) and the peripheral regions of the points in the two images, as expressed by the following expression (2).

[Math. 2]

$$E12 = \Sigma m \Sigma n |I1(x1+m,y1+n) - I2(x2+m,y2+n)| \quad (2)$$

Two regions being similar means the luminance values in the regions being close. Therefore, in the case of the expression (2), it can be said that the reliability is higher (similar) as the evaluation value E12 is smaller, and the reliability is lower (dissimilar) as the evaluation value E12 is larger.

In the image processing device 11, for the certain point P1, processing of searching the reference image for the point P2 having the smallest value of the expression (2) is performed as the corresponding point search. In a case where a pixel corresponding to an arbitrary pixel (a pixel where the object is reflected) in the captured image p1 is searched for as the corresponding point, the distance is calculated using the expression (1).

In the image processing device 11, such corresponding point search and distance calculation are mainly performed as stereo image processing.

<1-3. Rectification>

Rectification (parallelization processing) in the image processing device 11 will be described.

In general, a parallelization parameter, which is a parameter used for the parallelization processing, is obtained when the two cameras constituting the stereo camera system are fixed to a mounting jig. As a method of obtaining the parallelization parameter, there is a method described in Document 1 below. To specify an orientation of a camera in a three-dimensional space, it is sufficient that four known points on an image are given. It is also possible to specify more points than 4 points to improve the accuracy of the parallelization processing.

Document 1: Computer Vision—Geometry of Vision— ISBN: 978-4-339-02363-3, pp. 83-87

By the way, the cameras 12-1 and 12-2 used in the stereo camera system 1 are fisheye cameras. In a case of directly projecting a captured image captured by a fisheye camera onto one plane and performing the aforementioned parallelization processing, only a part of the captured image can be used for the processing. Therefore, the merit of taking a wide range of image using the fisheye lens reduces.

Figure 4:
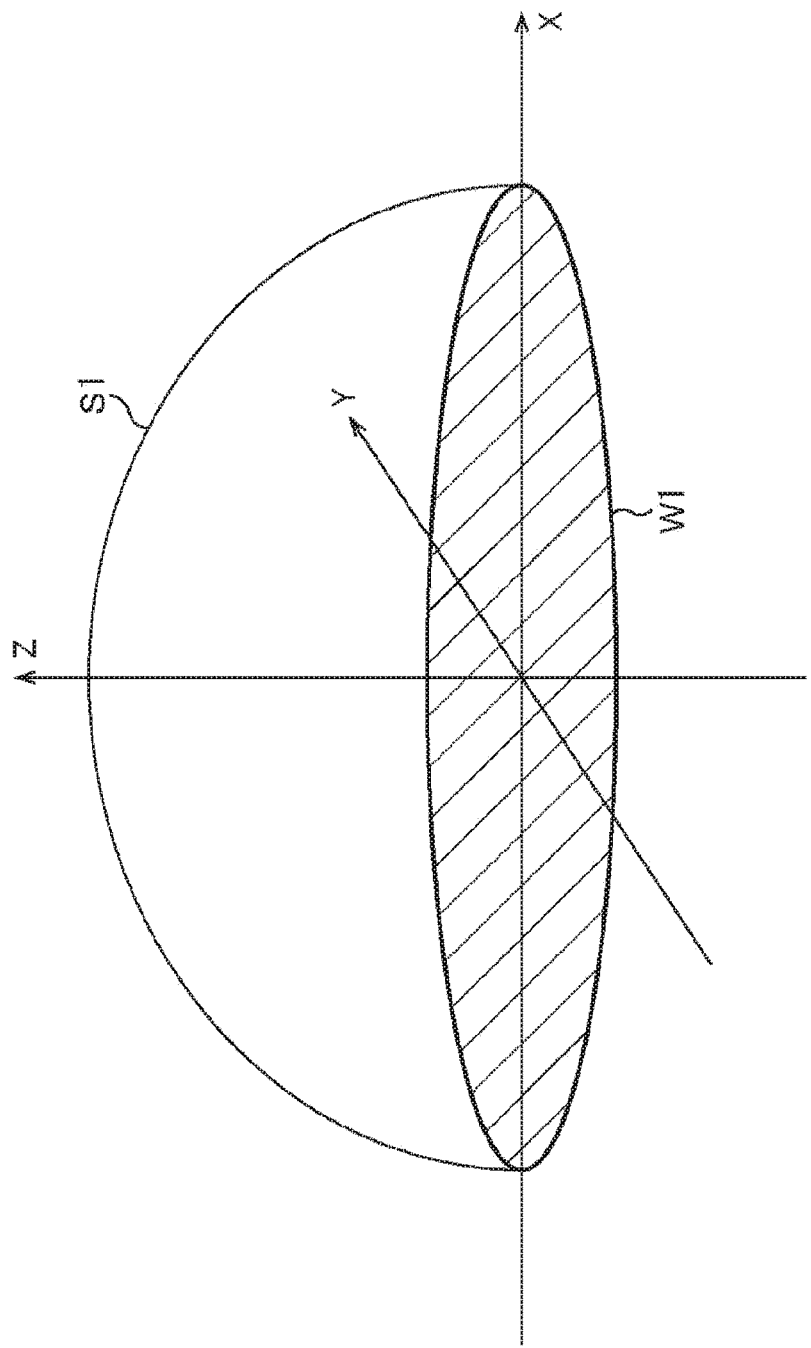
FIG. 4 is a diagram illustrating an example of a virtual spherical surface set in a wide-angle image.

FIG. 4 is a diagram illustrating an example of processing of a wide-angle image captured by the camera 12-1.

A shaded wide-angle image W1 corresponds to the captured image p1 captured by the camera 12-1. Since the camera 12-1 includes a range of approximately 180 degrees in its capture range, the wide-angle image W1 can be considered to be obtained by projecting an image on a spherical surface of an approximately half celestial sphere onto a plane.

Therefore, in the image processing device 11, the wide-angle image W1 is projected onto a half celestial virtual spherical surface S1. In FIG. 4, the imaging surface is on an XY plane, and the origin of the three-dimensional space is set at the center of the imaging surface. The center of the wide-angle image W1 is also located at the origin of the three-dimensional space.

As illustrated in FIG. 4, the virtual spherical surface S1 is set to have the same radius as the radius of the wide-angle image W1. A Z axis that is a perpendicular to the XY plane corresponds to the optical axis of the camera 12-1, and the Z axis intersects with the virtual spherical surface S1 at the zenith.

Figure 5:
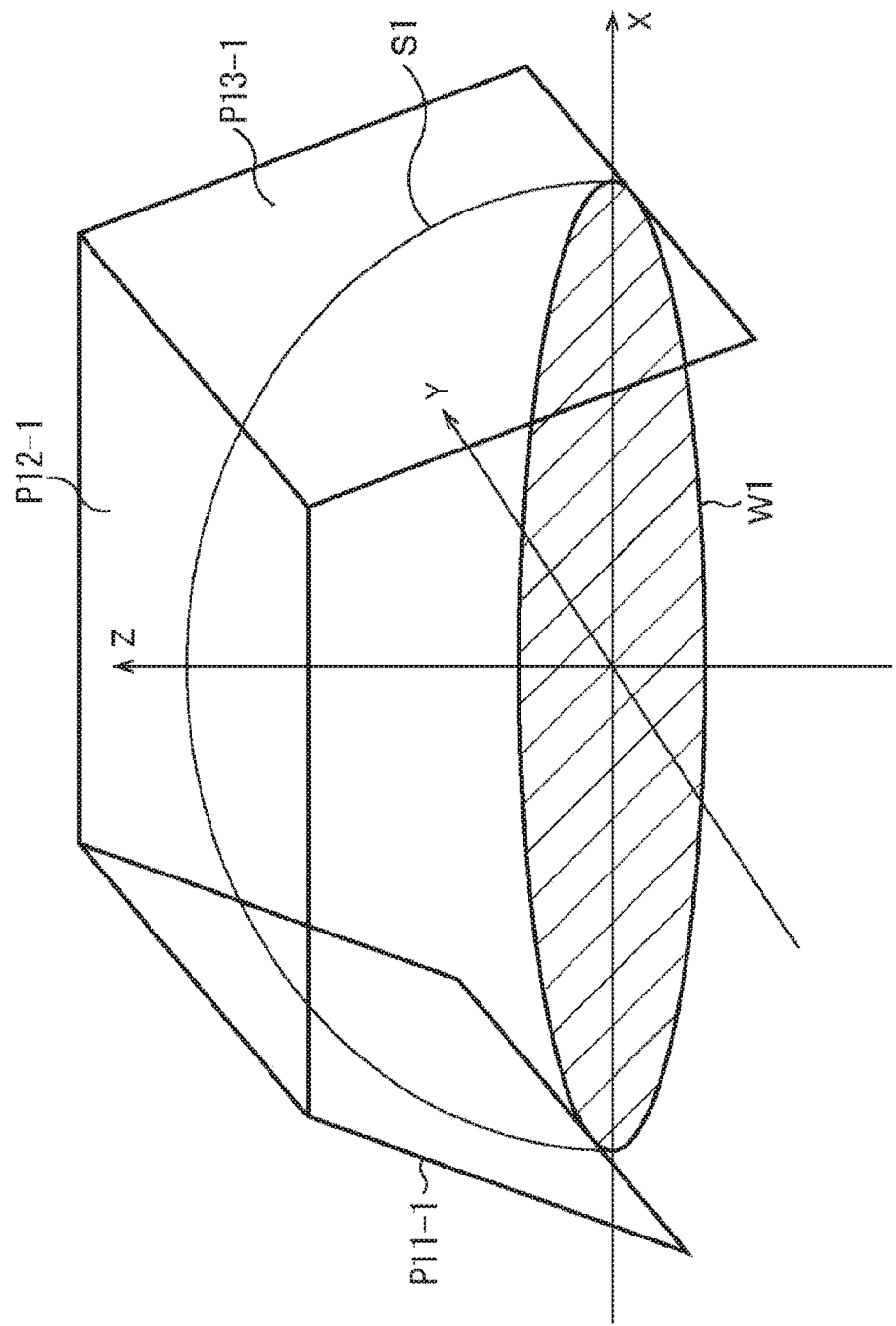
FIG. 5 is a diagram illustrating an example of reprojection of a wide-angle image onto a plane.

Furthermore, in the image processing device 11, as illustrated in FIG. 5, a projected image projected onto the virtual spherical surface S1 is reprojected onto a plurality of planes on the virtual spherical surface S1, and a plurality of planar images is generated.

FIG. 5 illustrates an example of projecting one wide-angle image W1 onto the virtual spherical surface S1 and reprojecting the projected image onto three planes. Planar images P11-1 to P13-1 are images projected onto planes set such that centers of the respective planes are in contact with the virtual spherical surface S1.

Figure 6:
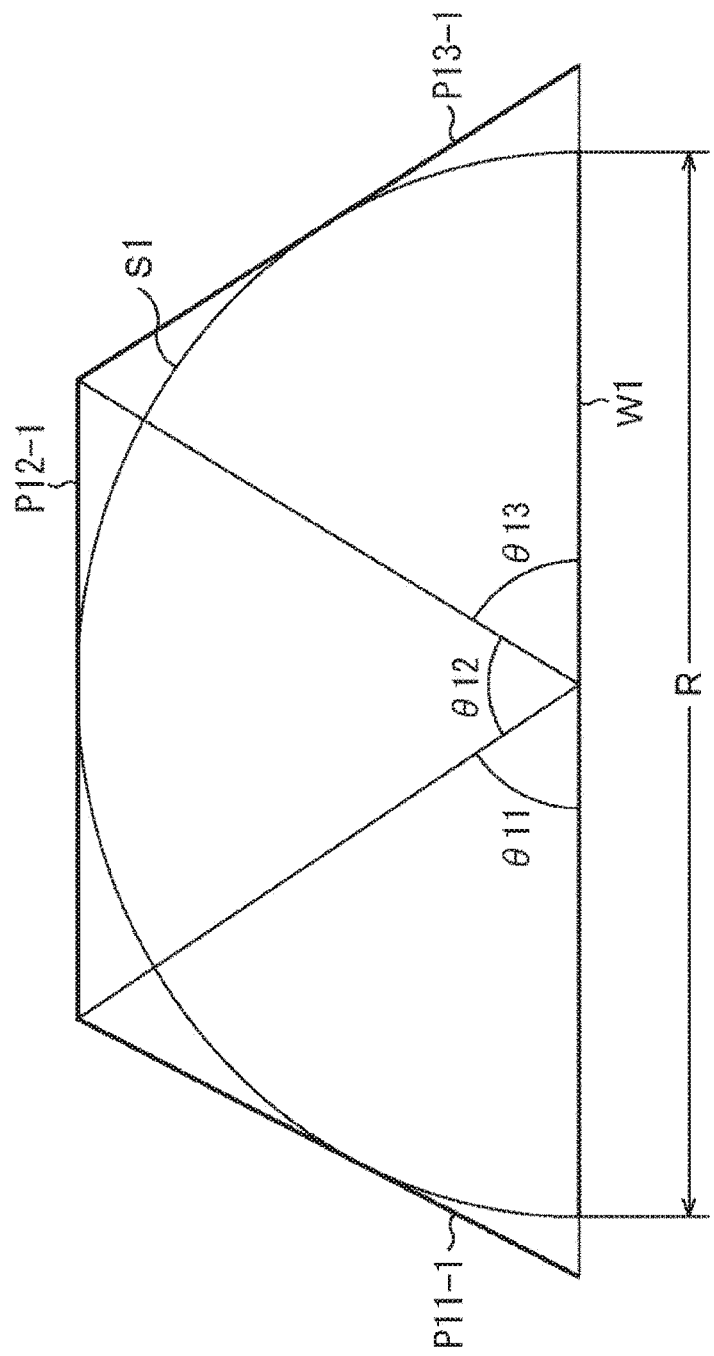
FIG. 6 is a diagram illustrating an example of setting of planes.

FIG. 6 is a diagram illustrating an example of setting of planes.

FIG. 6 illustrates a state in which the virtual spherical surface and the plurality of planes on the virtual spherical surface are viewed from a Y-axis direction. In this example, the entire viewing angle is divided into three viewing angles θ11 to θ13, and three planes are set in a trapezoidal shape to be projection surfaces of images in the range of the three viewing angles. The planes are set to be symmetric with reference to the Z axis (optical axis).

For example, the planar image P11-1 is generated by projecting a portion corresponding to the viewing angle θ11, of the projected image obtained by projecting the wide-angle image W1 onto the virtual spherical surface S1. The planar image P11-1 is an image reflecting the range of the viewing angle θ11, of the entire wide-angle image W1.

Similarly, the planar image P12-1 is generated by projecting a portion corresponding to the viewing angle θ12, of the projected image obtained by projecting the wide-angle image W1 onto the virtual spherical surface S1. The planar image P12-1 is an image reflecting the range of the viewing angle θ12, of the entire wide-angle image W1.

The planar image P13-1 is generated by projecting a portion corresponding to the viewing angle θ13, of the projected image obtained by projecting the wide-angle image W1 onto the virtual spherical surface S1. The planar image P13-1 is an image reflecting the range of the viewing angle θ13, of the entire wide-angle image W1.

The viewing angles θ11, θ12, and θ13 are set such that, for example, the sum of the viewing angles can include all viewing angles of the camera 12-1. Thereby, the rectification can be performed using the entire range captured in the wide-angle image captured by the fisheye camera.

Note that, here, the wide-angle image W1 is reprojected onto the three planes through the projection onto the virtual spherical surface S1. However, any number of planar images can be used as long as the number is plural. The wide-angle image W1 may be directly projected onto three planes without to generate the plurality of planar images through the projection onto the virtual spherical surface S1.

Figure 7:
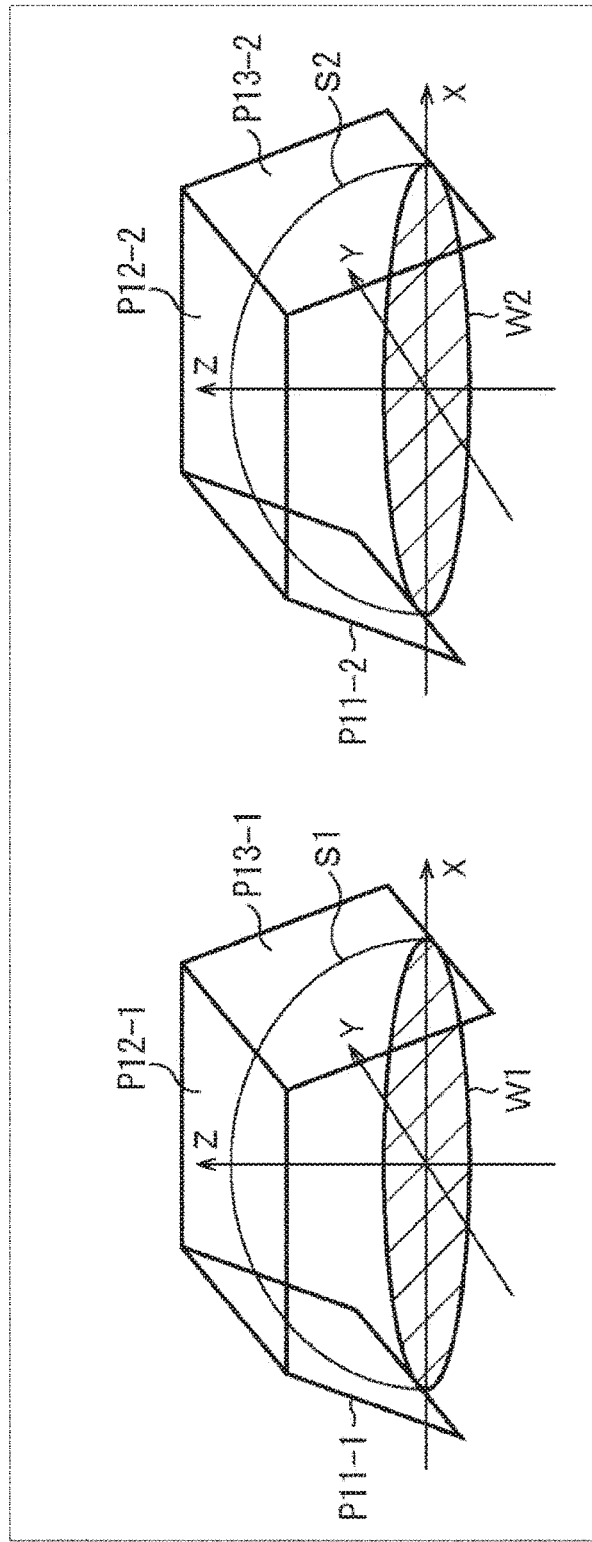
FIG. 7 is a diagram illustrating an example of setting of a plane.

In the image processing device 11, as illustrated in FIG. 7, similar processing is applied to a wide-angle image W2 corresponding to the captured image p2, and planar images P11-2 to P13-2 are generated through projection onto a virtual spherical surface S2.

The planar image P11-2 is an image generated by projecting a portion corresponding to the viewing angle θ11, of a projected image obtained by projecting the wide-angle image W2 onto the virtual spherical surface S2. The planar image P12-2 is an image generated by projecting a portion corresponding to the viewing angle θ12, of a projected image obtained by projecting the wide-angle image W2 onto the virtual spherical surface S2. The planar image P13-2 is an image generated by projecting a portion corresponding to the viewing angle θ13, of a projected image obtained by projecting the wide-angle image W2 onto the virtual spherical surface S2.

In the image processing device 11, the parallelization processing is performed for each image pair of the planar image P11-1 and the planar image P11-2, the planar image P12-1 and the planar image P12-2, and the planar image P13-1 and the planar image P13-2, which are generated by reprojecting the images according to the same viewing angle.

Optical Axis Correction

By the way, in the case of independently performing the parallelization processing for each image pair of the planar images as described above, there are some cases where an inconsistency is caused in a connected portion of the planar images (for example, a boundary portion of the planar image P11-1 and the planar image P12-1). A lack of distance information occurs due to the inconsistency of the connected portion.

Therefore, in the image processing device 11, not to cause the inconsistency in the connected portion, optical axis correction of the two fisheye cameras is performed before reprojecting the projected images onto the plurality of planes, as described above. For example, the inconsistency in the connected portion is caused due to a deviation (nonparallel) of the optical axes of the two fisheye cameras as illustrated in FIG. 8, for example.

Figure 8:
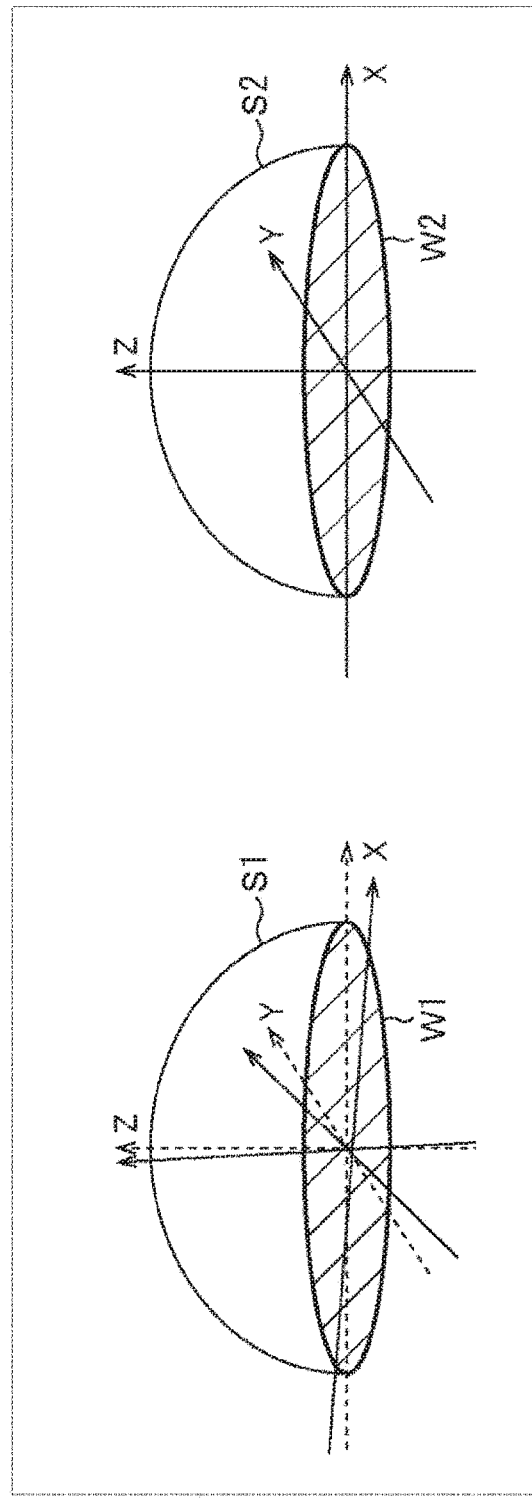
FIG. 8 is a diagram illustrating an example of a shift of an optical axis.

In the example in FIG. 8, the optical axis (solid line) of the camera 12-1 used for capturing the wide-angle image W1 illustrated on the left side deviates from the optical axis of the camera 12-2 used for capturing the wide-angle image W2 illustrated on the right side. For example, by correcting the optical axis of the camera 12-1 as illustrated by the broken line, the parallelism of the optical axes of the two fisheye cameras is ensured.

Note that the optical axis correction in the image processing device 11 is electronic processing. The processing of setting a corrected optical axis is performed as optical axis correction processing.

Optical axis correction in the image processing device 11 will be described with reference to FIGS. 9 to 11.

Figure 9:
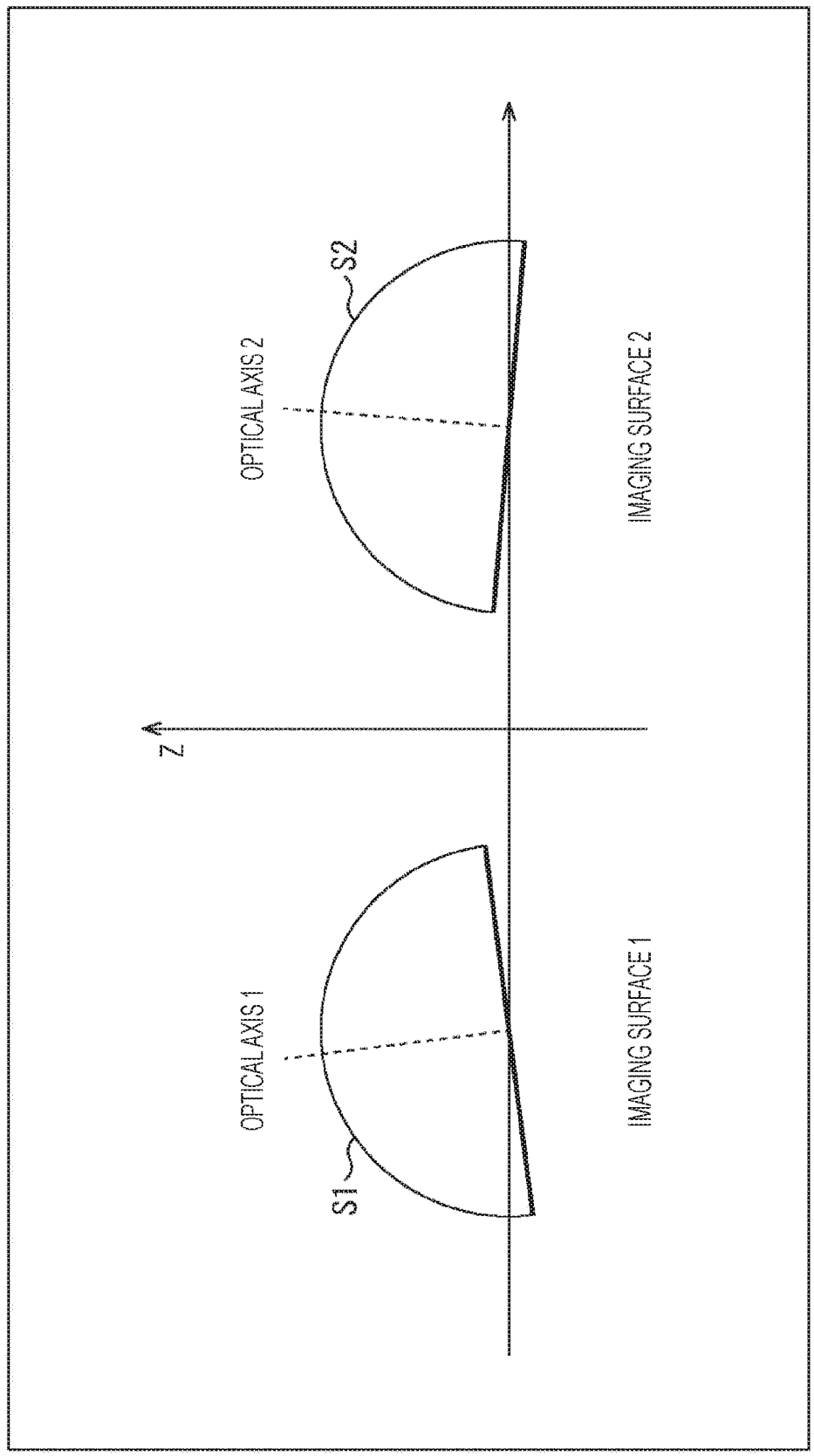
FIG. 9 is a diagram illustrating an example of optical axis correction.

FIG. 9 is a diagram illustrating an example of optical axes of the camera 12-1 and the camera 12-2. FIG. 9 is a diagram of the three-dimensional space of an optical system of the camera 12-1 and the camera 12-2 described with reference to FIG. 7 and the like viewed from the Y-axis direction. FIGS. 10 and 11 are similarly illustrated.

In FIG. 9, as illustrated by the broken line on the left side, an optical axis 1 of the camera 12-1 is illustrated as a perpendicular set to the center of the imaging surface 1 onto which the wide-angle image W1 is projected. The optical axis 1 passes through the zenith of the virtual spherical surface S1. Since the imaging surface 1 is not parallel to the XY plane, the optical axis 1 is slightly inclined with respect to the Z axis.

Similarly, as illustrated by the broken line on the right side, an optical axis 2 of the camera 12-2 is illustrated as a perpendicular set to the center of the imaging surface 2 onto which the wide-angle image W2 is projected. The optical axis 2 passes through the zenith of the virtual spherical surface S2. Since the imaging surface 2 is not parallel to the XY plane, the optical axis 2 is also slightly inclined with respect to the Z axis. The optical axis 1 and the optical axis 2 are not parallel to each other.

Figure 10:
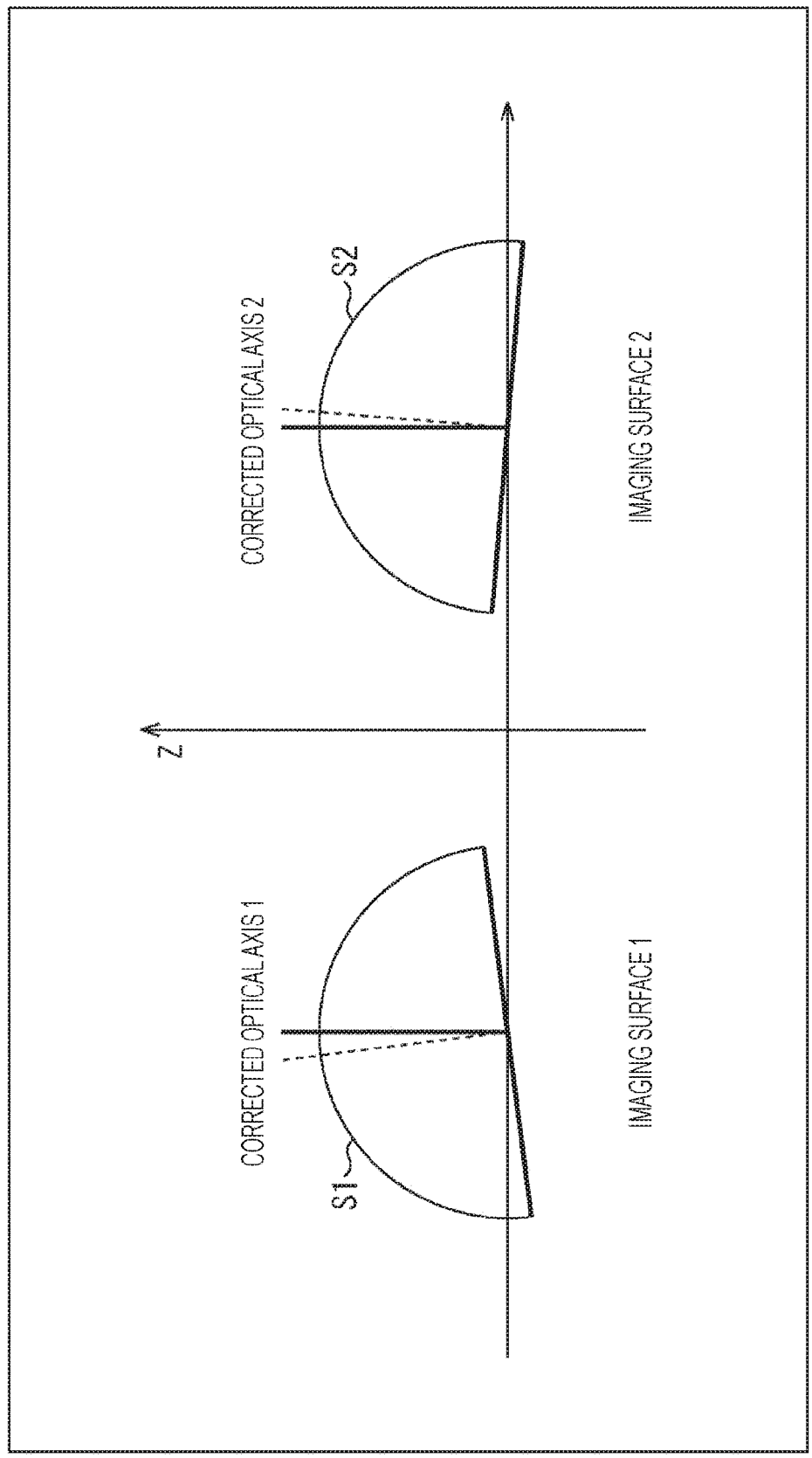
FIG. 10 is a diagram illustrating an example of optical axis correction.

After the optical axes are detected, optical axes parallel to each other are set as corrected optical axes, as illustrated by the solid lines in FIG. 10. The corrected optical axis 1 obtained by correcting the optical axis 1 is an axis parallel to the Z axis set to the center of the imaging surface 1. Furthermore, the corrected optical axis 2 obtained by correcting the optical axis 2 is an axis parallel to the Z axis set to the center of the imaging surface 2.

FIG. 10 illustrates only the correction in the X-axis direction. However, correction is similarly performed in the Y-axis direction and the Z-axis direction.

Such a method of obtaining and correcting an optical axis is disclosed in, for example, Document 2 below.

Document 2: "Calibrating Fisheye Camera by Stripe Pattern Based upon Spherical Model", Masao Nakano, Shigang Li, Norishige Chiba, Journal of The Institute of Electronics, Information and Communication Engineers D, Vol. J90-D, No. 1, pp. 73-82 (2007)

In the method described in Document 2, a known pattern (object) is captured and an optical axis is obtained on the basis of a distortion For example, the known object is arranged in an optical axis direction of the cameras with a distance sufficiently separated from the cameras. The sufficient distance referred here is only required to be a distance that allows x1−x2 in the expression (1) to approach zero as much as possible in the two stereo cameras.

The known object arranged in such a manner should be reflected at the zenith of each of the virtual spherical surfaces of the two stereo cameras in a case where the optical axes are parallel. A position on the virtual spherical surface at which the known object is reflected is detected, and the optical axis is corrected by an amount corresponding to a difference between the detected position and the zenith, whereby the corrected optical axis can be obtained.

Such optical axis correction is performed at the time of parallelization parameter generation. The generation of the parallelization parameter is performed at predetermined timing before the start of operation of the stereo camera system 1 (before the distance calculation is actually performed). Information of the corrected optical axis is stored in the image processing device 11 and is referred to to set the corrected optical axis at the time of actual distance calculation.

Reprojection of the projected image projected onto the virtual spherical surface onto the plurality of planes as described above is performed after setting of the corrected optical axes.

Figure 11:
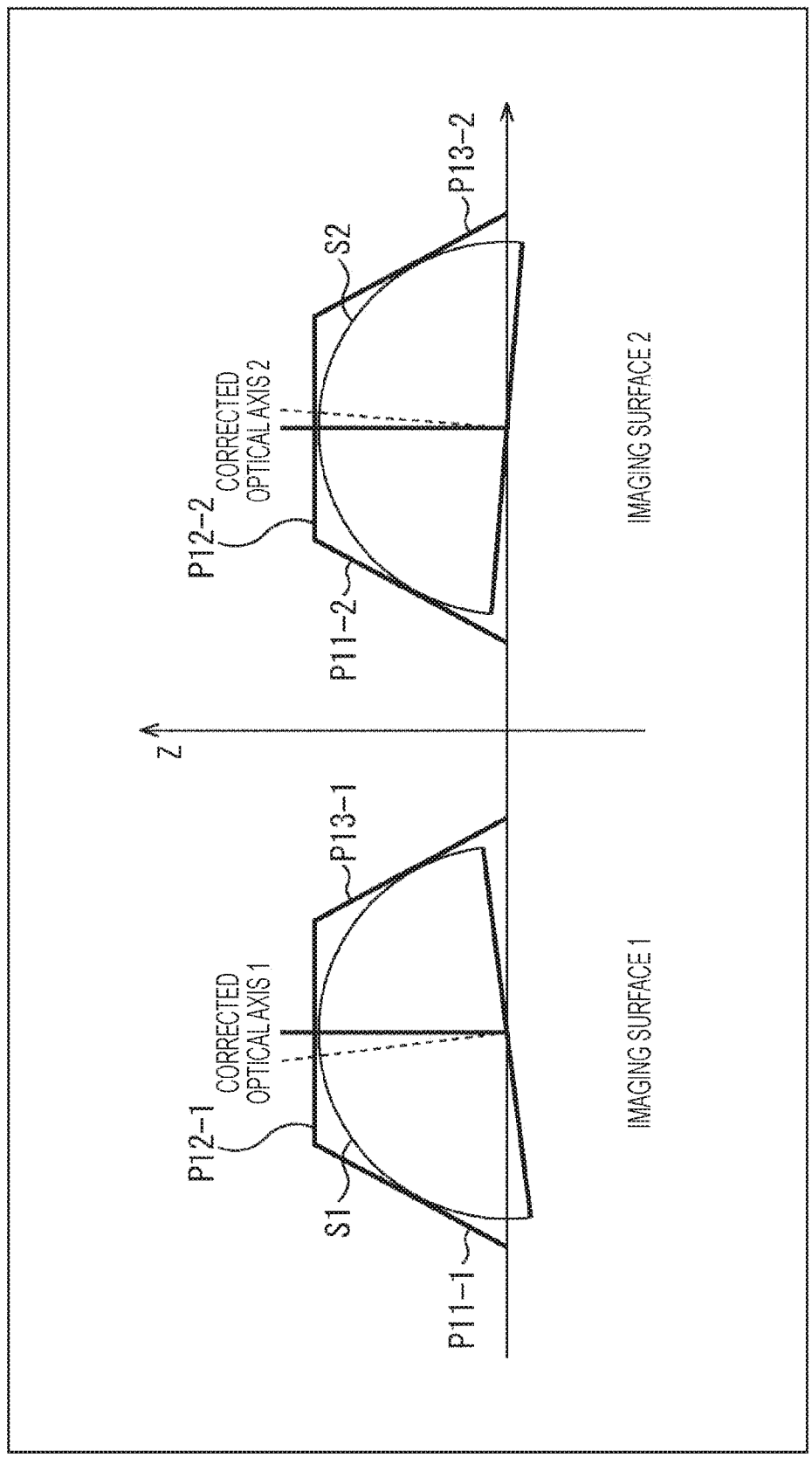
FIG. 11 is a diagram illustrating an example of setting of a plane.

FIG. 11 is a diagram illustrating an example of projection of the projected image.

As illustrated in FIG. 11, the plurality of planes on the virtual spherical surface is set with reference to the corrected optical axis. The viewing angle of the fisheye camera is divided with reference to the corrected optical axis, and a plane is set according to each divided viewing angle.

For example, the plane of the planar image P12-1 illustrated on the left side in FIG. 11 is a plane parallel to the XY plane, in other words, a plane having the corrected optical axis 1 as a perpendicular. The plane of the planar image P11-1 and the plane of the planar image P13-1 are similarly set with reference to the corrected optical axis.

Figure 12:
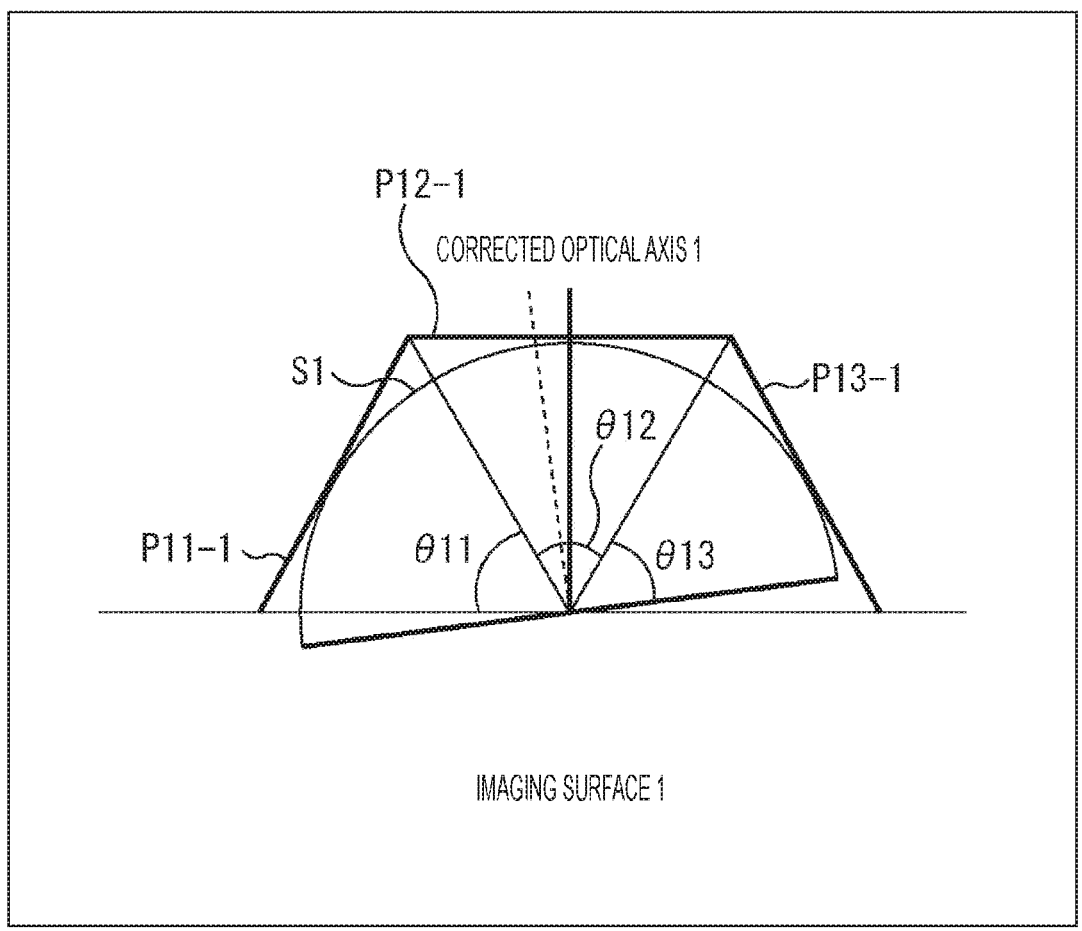
FIG. 12 is a diagram illustrating an example of setting of a plane.

As illustrated in FIG. 12, the planar image P11-1 is an image generated by projecting the range of the viewing angle θ11, of the projected image obtained by projecting the wide-angle image W1 onto the virtual spherical surface S1.

Furthermore, the planar image P12-1 is an image generated by projecting the range of the viewing angle θ12, of the projected image obtained by projecting the wide-angle image W1 onto the virtual spherical surface S1. The planar image P13-1 is an image generated by projecting the range of the viewing angle θ13, of the projected image obtained by projecting the wide-angle image W1 onto the virtual spherical surface S1.

Returning to the description of FIG. 11, the projected image obtained by projecting the wide-angle image W2 onto the virtual spherical surface S2 is also reprojected onto the planes set with reference to the corrected optical axis 2, and the planar images P11-2 to P13-2 are generated.

Projective Transformation

In the above rectification, it can be said that the rectification is completed if the accuracy of various types of processing, such as the detection accuracy of the optical axes, the accuracy of the parallelization of the two optical axes, and the projection accuracy to the virtual spherical surfaces, are complete.

However, in reality, each accuracy has an error, and the error appears as trapezoidal distortion on the plurality of planar images. In the image processing device 11, correction using projective transformation is performed for each image pair of the planar images.

The projective transformation is expressed as the following expressions (3) and (4).

[Math. 3]

$$u=(x*a+y*b+c)/(x*g+y*h+1) \quad (3)$$

[Math. 4]

$$v=(x*d+y*e+f)/(x*g+y*h+1) \quad (4)$$

The variables in the expressions (3) and (4) represent the following content.

x and y: X and Y coordinates before transformation a, b, c, d, e, f, g, and h: Transformation coefficients u and v: Coordinates after transformation Since there are eight unknown parameters in the projective transformation, four corresponding points on the planes need to be known to obtain the eight parameters.

The planar images P11-1 to P13-1 generated on the basis of the wide-angle image W1 are used as base images, and the planar images P11-2 to P13-2 generated on the basis of the wide-angle image W2 are used as reference images.

Four points on the planar image P11-1 and four corresponding points on the planar image P11-2 corresponding to the four points are specified, and simultaneous equations are solved, whereby a projective transformation parameter is obtained. This projective transformation parameter is a parameter for the image pair of the planar image P11-1 and the planar image P11-2, and is used for projective transformation of the planar image P11-2 as a reference image.

Similarly, four points on the planar image P12-1 and four corresponding points on the planar image P12-2 corresponding to the four points are specified, and simultaneous equations are solved, whereby a projective transformation parameter is obtained. This projective transformation parameter is a parameter for the image pair of the planar image P12-1 and the planar image P12-2, and is used for projective transformation of the planar image P12-2 as a reference image.

Four points on the planar image P13-1 and four corresponding points on the planar image P13-2 corresponding to the four points are specified, and simultaneous equations are solved, whereby a projective transformation parameter is obtained. This projective transformation parameter is a parameter for the image pair of the planar image P13-1 and the planar image P13-2, and is used for projective transformation of the planar image P13-2 as a reference image.

The number of the corresponding points specified on each image may be four or more. Furthermore, as the method of specifying the corresponding points, an administrator may manually specify the corresponding points, or a printed known pattern such as a test chart may be used and the known pattern may be automatically recognized by image processing. A wrong corresponding point or a low effective corresponding point may be may excluded by the administrator from the corresponding points automatically recognized by the image processing, and corresponding points may be so-called semi-automatically specified.

FIGS. 13A and 13B are diagrams illustrating an example of the projective transformation.

FIG. 13A is a diagram illustrating an example in which the planar images P11-1 to P13-1 as base images are expanded. It is assumed that an oblong object O is reflected across the planar images P11-1 to P13-1.

The upper part in FIG. 13B is a diagram illustrating the expanded planar images P11-2 to P13-2 as reference images. In this example, the object O is distorted. Such a distortion appears due to an error in each processing as described above.

In the image processing device 11, for example, projective transformation using the projective transformation parameter as described above is applied to each of the planar images P11-2 to P13-2 as reference images. By the projective transformation, the planar images P11-2 to P13-2 in which the object O with corrected distortion at connected portions is reflected are obtained, as illustrated in the lower part in FIG. 13B.

Such calculation of the projective transformation parameters is performed at the time of parallelization parameter generation. The parallelization parameter is generated before the start of operation of the stereo camera system 1. Information of the projective transformation parameters is stored in the image processing device 11 and is referred to to perform the projective transformation for the reference images at the time of actual distance calculation.

As described above, the rectification in the image processing device 11 is configured by two stages of processing including the optical axis correction (image processing using corrected optical axes) and the projective transformation.

Thereby, the rectification can be more accurately performed even in the case of using a stereo camera including cameras with wide viewing angles such as the fisheye cameras. By accurately performing the rectification, the distance can be more accurately calculated.

<1-4. Configuration Example of Image Processing Device>

Figure 14:
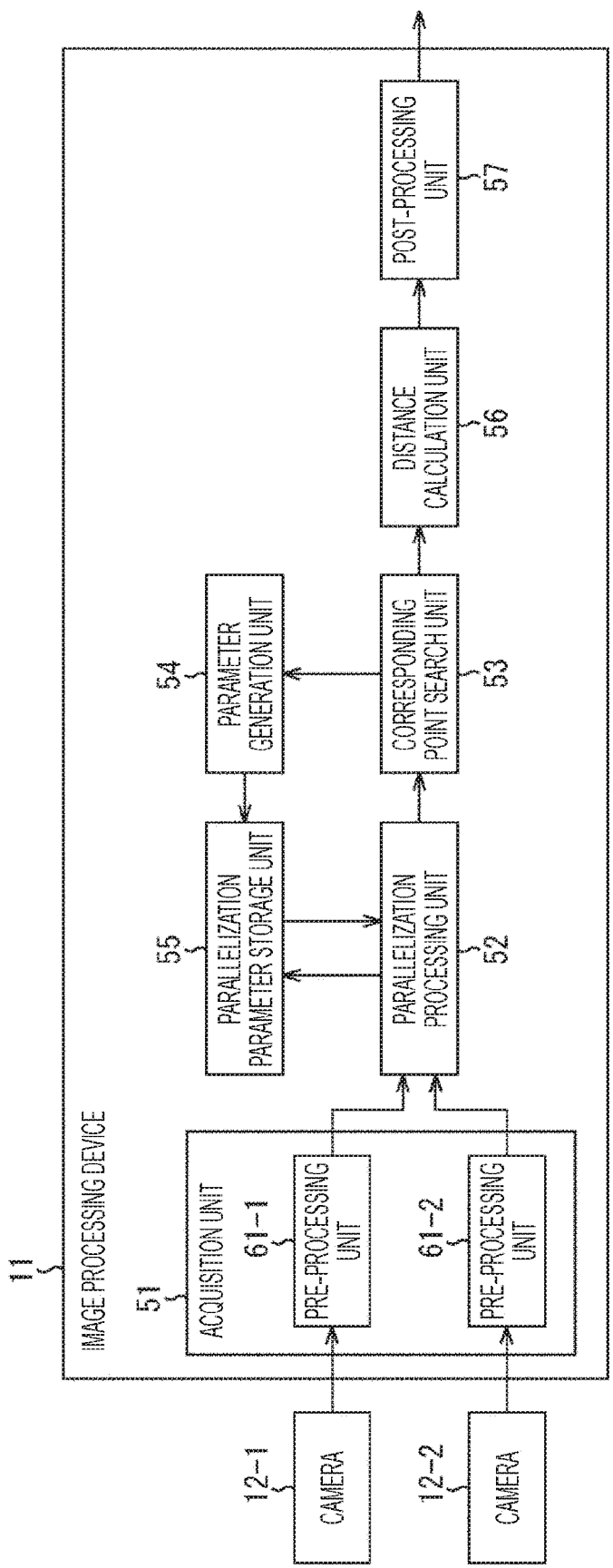
FIG. 14 is a block diagram illustrating a configuration example of an image processing device.

FIG. 14 is a block diagram illustrating a configuration example of the image processing device 11.

As illustrated in FIG. 14, the image processing device 11 includes an acquisition unit 51, a parallelization processing unit 52, a corresponding point search unit 53, a parameter generation unit 54, a parallelization parameter storage unit 55, a distance calculation unit 56, and a post-processing unit 57. The acquisition unit 51 includes a pre-processing unit 61-1 and a pre-processing unit 61-2. At least a part of the functional units illustrated in FIG. 14 is realized by executing a predetermined program by a CPU of a computer that realizes the image processing device 11.

The wide-angle images captured by the camera 12-1 and the camera 12-2 are input to the acquisition unit 51. The acquisition unit 51 functions as an acquisition unit that acquires the stereo image captured by the stereo camera.

The pre-processing unit 61-1 of the acquisition unit 51 applies pre-processing to the wide-angle image captured by the camera 12-1. For example, processing such as fisheye lens aberration correction is performed as pre-processing. The pre-processing unit 61-1 outputs the wide-angle image to which the pre-processing has been applied to the parallelization processing unit 52.

Similarly, the pre-processing unit 61-2 applies pre-processing to the wide-angle image captured by the camera 12-2. The pre-processing unit 61-2 outputs the wide-angle image to which the pre-processing has been applied to the parallelization processing unit 52.

The parallelization processing unit 52 obtains the corrected optical axes of the camera 12-1 and the camera 12-2 as described above at the time of parallelization parameter generation, and stores the information of the corrected optical axes in the parallelization parameter storage unit 55. Furthermore, the parallelization processing unit 52 outputs, to the corresponding point search unit 53, the plurality of planar images generated by reprojecting projected images onto the plurality of planes set with reference to the corrected optical axes at the time of parallelization parameter generation.

The parallelization processing unit 52 sets the corrected optical axes on the basis of the information of the corrected optical axes stored in the parallelization parameter storage unit 55 at the time of actual distance calculation, and performs reprojection onto the plurality of planes set with reference to the corrected optical axes to generate the plurality of planar images. Furthermore, the parallelization processing unit 52 applies the projective transformation to each of the reference images on the basis of the projective transformation parameter stored in the parallelization parameter storage unit 55. The parallelization processing unit 52 outputs the plurality of planar images as the base images and the plurality of planar images after projective transformation as the reference images to the corresponding point search unit 53.

The corresponding point search unit 53 performs the corresponding point search for each image pair of the planar images supplied from the parallelization processing unit 52 at the time of parallelization parameter generation, and outputs the information of the corresponding points to the parameter generation unit 54. The corresponding point search unit 53 performs the corresponding point search for each image pair of the planar image P11-1 and the planar image P11-2, the planar image P12-1 and the planar image P12-2, and the planar image P13-1 and the planar image P13-2.

Furthermore, the corresponding point search unit 53 performs the corresponding point search for each image pair of the planar images supplied from the parallelization processing unit 52 at the time of actual distance calculation, and outputs information of the corresponding points to the distance calculation unit 56. At the time of actual distance calculation, the plurality of planar images as the base images and the plurality of planar images after projective transformation as the reference images are supplied from the parallelization processing unit 52. The corresponding point search unit 53 performs the corresponding point search for each image pair of the planar image P11-1 and the planar image P11-2 after projective transformation, the planar image P12-1 and the planar image P12-2 after projective transformation, and the planar image P13-1 and the planar image P13-2 after projective transformation.

The parameter generation unit 54 generates the projective transformation parameter for each image pair on the basis of the information of the corresponding points supplied from the corresponding point search unit 53 at the time of parallelization parameter generation. The parameter generation unit 54 outputs and stores the generated projective transformation parameters to the parallelization parameter storage unit 55.

The parallelization parameter storage unit 55 stores the information of the corrected optical axes supplied from the parallelization processing unit 52 and the projective transformation parameters supplied from the parameter generation unit 54 as parallelization parameters at the time of parallelization parameter generation. The parallelization parameters stored in the parallelization parameter storage unit 55 are read at the time of actual distance calculation.

The distance calculation unit 56 performs the calculation of the above expression (1) on the basis of the information of the corresponding points supplied from the corresponding point search unit 53 to calculate the distance to the target object. The distance calculation unit 56 outputs the calculated distance information to the post-processing unit 57.

The post-processing unit 57 performs post-processing on the basis of the distance information calculated by the distance calculation unit 56, and outputs a processing result. For example, clustering and recognition processing of objects using the distance information is performed as the post-processing.

Figure 15:
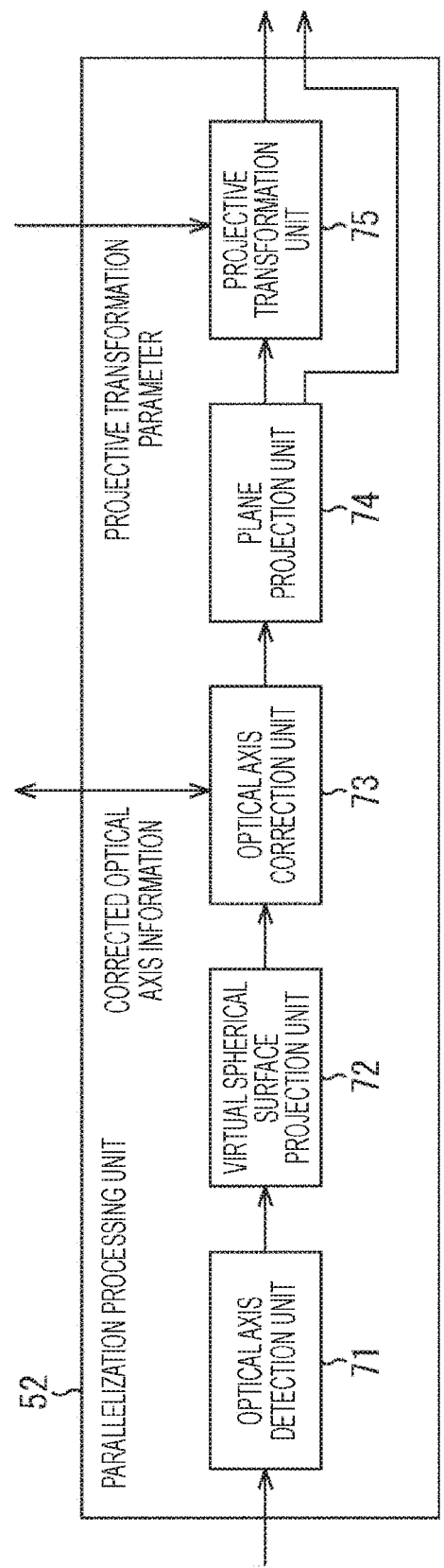
FIG. 15 is a block diagram illustrating a configuration example of a parallelization processing unit.

FIG. 15 is a block diagram illustrating a configuration example of the parallelization processing unit 52.

As illustrated in FIG. 15, the parallelization processing unit 52 includes an optical axis detection unit 71, a virtual spherical surface projection unit 72, an optical axis correction unit 73, a plane projection unit 74, and a projective transformation unit 75.

The optical axis detection unit 71 detects the optical axis of the camera 12-1 on the basis of the wide-angle image supplied from the pre-processing unit 61-1 and detects the optical axis of the camera 12-2 on the basis of the wide-angle image supplied from the pre-processing unit 61-2. For example, the Z axis of when the wide-angle image is virtually arranged at the origin of the XY plane is detected as the optical axis. The optical axis detection unit 71 outputs information on the optical axes of the cameras 12-1 and 12-2 to the virtual spherical surface projection unit 72.

The virtual spherical surface projection unit 72 sets the virtual spherical surface S1 to the wide-angle image W1 captured by the camera 12-1, and projects the wide-angle image W1 onto the virtual spherical surface S1. Furthermore, the virtual spherical surface projection unit 72 sets the virtual spherical surface S2 to the wide-angle image W2 captured by the camera 12-2, and projects the wide-angle image W2 onto the virtual spherical surface S2. The virtual spherical surfaces S1 and S2 are set such that the respective zeniths intersects with the optical axes detected by the optical axis detection unit 71. The virtual spherical surface projection unit 72 outputs the projected image of the wide-angle image W1 and the projected image of the wide-angle image W2 to the optical axis correction unit 73 together with the information of the respective virtual spherical surfaces.

The optical axis correction unit 73 obtains the corrected optical axes of the camera 12-1 and the camera 12-2 as described above at the time of parallelization parameter generation, and outputs and stores the information of the corrected optical axes to the parallelization parameter storage unit 55. Furthermore, the optical axis correction unit 73 outputs the projected image of the wide-angle image W1 and the projected image of the wide-angle image W2 to the plane projection unit 74 together with the information of the respective virtual spherical surfaces and the corrected optical axes.

The optical axis correction unit 73 sets the corrected optical axes on the basis of the information of the corrected optical axes stored in the parallelization parameter storage unit 55 at the time of actual distance calculation. The optical axis correction unit 73 outputs the projected image of the wide-angle image W1 and the projected image of the wide-angle image W2 to the plane projection unit 74 together with the information of the respective virtual spherical surfaces and the corrected optical axes.

The plane projection unit 74 sets the plurality of planes on the virtual spherical surface S1 with reference to the corrected optical axis of the camera 12-1, and reprojects the projected image of the wide-angle image W1 onto the planes to generate the plurality of planar images. Furthermore, the plane projection unit 74 sets the plurality of planes on the virtual spherical surface S2 with reference to the corrected optical axis of the camera 12-2, and reprojects the projected image of the wide-angle image W2 onto the planes to generate the plurality of planar images. The plane projection unit 74 functions as a generation unit that generates the plurality of planar images on the basis of the wide-angle images.

The plane projection unit 74 outputs the plurality of planar images generated on the basis of the wide-angle image W1 as the base images and the plurality of planar images generated on the basis of the wide-angle image W2 as the reference images to the corresponding point search unit 53 at the time of parallelization parameter generation.

The plane projection unit 74 outputs the plurality of planar images generated on the basis of the wide-angle image W1 as the base images and the plurality of planar images generated on the basis of the wide-angle image W2 as the reference images to the projective transformation unit 75 at the time of actual distance calculation.

Furthermore, the projective transformation unit 75 applies the projective transformation to each of the reference images on the basis of the projective transformation parameter stored in the parallelization parameter storage unit 55 at the time of actual distance calculation. The projective transformation unit 75 outputs the plurality of base images and the plurality of reference images after projective transformation to the corresponding point search unit 53.

<1-5. Operation of Image Processing Device>

Here, an operation of the image processing device 11 having the above configuration will be described.

First, the processing by the image processing device 11 for generating the parallelization parameter will be described with reference to the flowchart in FIG. 16.

Figure 16:
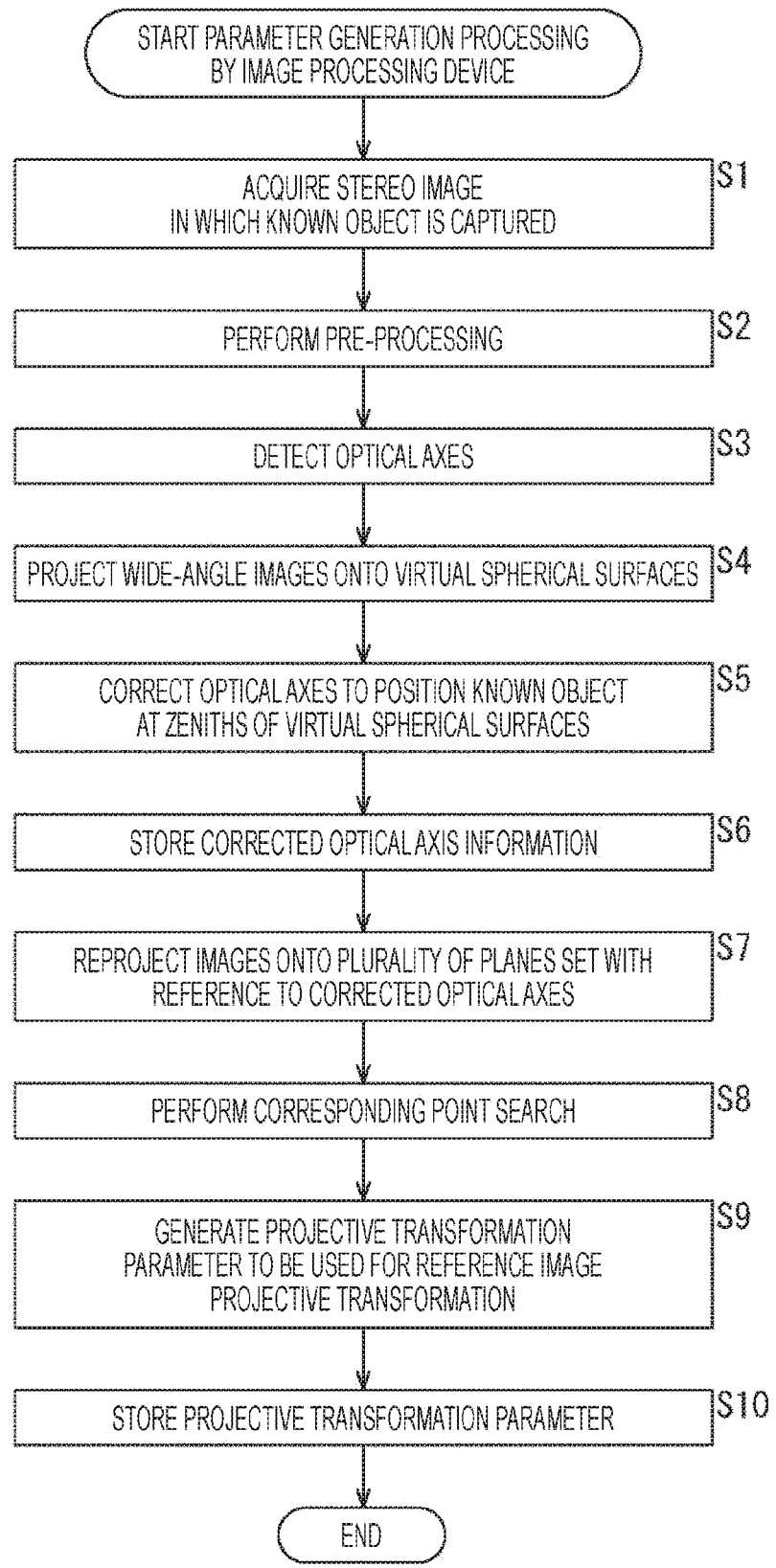
FIG. 16 is a flowchart for describing parallelization parameter generation processing of the image processing device.

The processing in FIG. 16 is performed at predetermined timing before the start of operation of the stereo camera system 1. The stereo image obtained by capturing a known object prepared for generating the parallelization parameter is input to the image processing device 11. The known object used for generating the parallelization parameter may be a three-dimensional object or may be a planar object such as a test chart on which a known pattern is printed.

In step S1, the acquisition unit 51 receives and acquires the stereo image including the wide-angle image captured by the camera 12-1 and the wide-angle image captured by the camera 12-2.

In step S2, the pre-processing unit 61-1 applies the pre-processing to the wide-angle image captured by the camera 12-1. Furthermore, the pre-processing unit 61-2 applies the pre-processing to the wide-angle image captured by the camera 12-2.

In step S3, the optical axis detection unit 71 of the parallelization processing unit 52 detects the optical axis of the camera 12-1 on the basis of the wide-angle image supplied from the pre-processing unit 61-1 and detects the optical axis of the camera 12-2 on the basis of the wide-angle image supplied from the pre-processing unit 61-2.

In step S4, the virtual spherical surface projection unit 72 sets the virtual spherical surface S1 to the wide-angle image captured by the camera 12-1, and projects the wide-angle image onto the virtual spherical surface S1. Furthermore, the virtual spherical surface projection unit 72 sets the virtual spherical surface S2 to the wide-angle image captured by the camera 12-2, and projects the wide-angle image onto the virtual spherical surface S2.

In step S5, the optical axis correction unit 73 detects the position of the known object on the virtual spherical surface S1 by analyzing the projected image projected onto the virtual spherical surface S1, and corrects the optical axis by the amount corresponding to the difference between the position and the zenith to obtain the corrected optical axis of the camera 12-1. Furthermore, the optical axis correction unit 73 detects the position of the known object on the virtual spherical surface S2 by analyzing the projected image projected onto the virtual spherical surface S2, and corrects the optical axis by the amount corresponding to the difference between the position and the zenith to obtain the corrected optical axis of the camera 12-2.

In step S6, the optical axis correction unit 73 outputs and stored the information of the corrected optical axes of the cameras 12-1 and 12-2 to the parallelization parameter storage unit 55.

In step S7, the plane projection unit 74 sets the plurality of planes on the virtual spherical surface S1 with reference to the corrected optical axis of the camera 12-1, and reprojects the projected image onto the planes to generate the plurality of base images. Furthermore, the plane projection unit 74 sets the plurality of planes on the virtual spherical surface S2 with reference to the corrected optical axis of the camera 12-2, and reprojects the projected image onto the planes to generate the plurality of reference images.

In step S8, the corresponding point search unit 53 performs the corresponding point search for each image pair of the base image and the reference image supplied from the plane projection unit 74, and outputs the information of the corresponding points to the parameter generation unit 54.

In step S9, the parameter generation unit 54 generates the projective transformation parameter for each image pair on the basis of the corresponding points searched by the corresponding point search unit 53.

In step S10, the parameter generation unit 54 outputs and stores the generated projective transformation parameters to the parallelization parameter storage unit 55.

Through the above processing, the parallelization parameter storage unit 55 stores the information of the corrected optical axes and the projective transformation parameters as the parallelization parameters.

Next, processing by the image processing device 11 for actually calculating the distance to the target object will be described with reference to the flowchart in FIG. 17.

Figure 17:
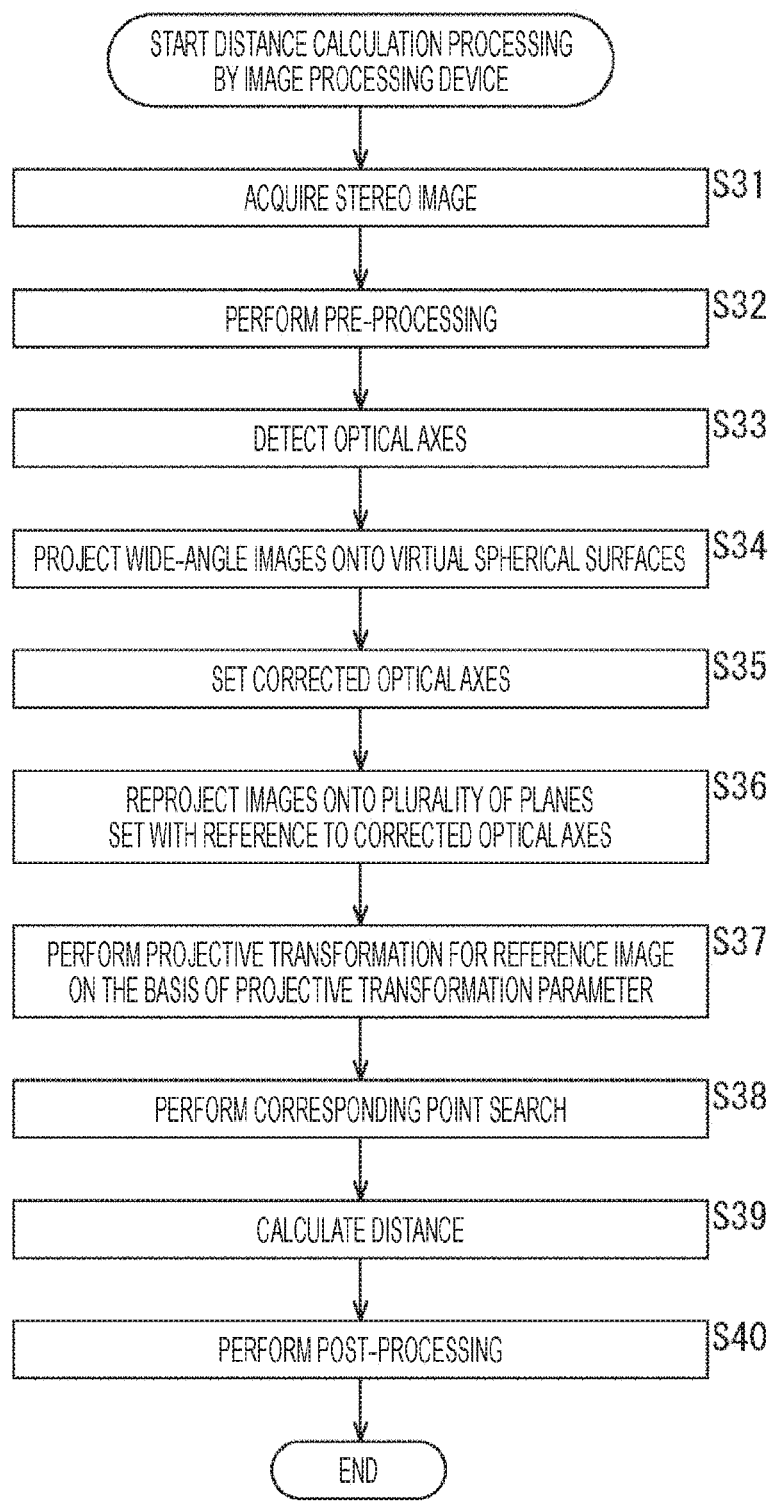
FIG. 17 is a flowchart for describing distance calculation processing of the image processing device.

The processing in FIG. 17 is performed at predetermined timing such as during traveling in a state where the stereo camera system 1 is attached to an automobile. A stereo image obtained by capturing surrounding landscape during traveling is input to the image processing device 11.

Note that which object is targeted as an object to be calculated in distance is specified by, for example, a control unit (not illustrated) by analyzing the stereo image. Information specifying the identified object is supplied to, for example, the corresponding point search unit 53 and the distance calculation unit 56.

In step S31, the acquisition unit 51 receives and acquires the stereo image including the wide-angle image captured by the camera 12-1 and the wide-angle image captured by the camera 12-2.

In step S32, the pre-processing unit 61-1 applies the pre-processing to the wide-angle image captured by the camera 12-1. Furthermore, the pre-processing unit 61-2 applies the pre-processing to the wide-angle image captured by the camera 12-2.

In step S33, the optical axis detection unit 71 of the parallelization processing unit 52 detects the optical axis of the camera 12-1 on the basis of the wide-angle image supplied from the pre-processing unit 61-1 and detects the optical axis of the camera 12-2 on the basis of the wide-angle image supplied from the pre-processing unit 61-2.

In step S34, the virtual spherical surface projection unit 72 sets the virtual spherical surface S1 to the wide-angle image captured by the camera 12-1, and projects the wide-angle image onto the virtual spherical surface S1. Furthermore, the virtual spherical surface projection unit 72 sets the virtual spherical surface S2 to the wide-angle image captured by the camera 12-2, and projects the wide-angle image onto the virtual spherical surface S2.

In step S35, the optical axis correction unit 73 sets the respective corrected optical axes of the camera 12-1 and the camera 12-2 on the basis of the information of the corrected optical axes stored in the parallelization parameter storage unit 55.

In step S36, the plane projection unit 74 sets the plurality of planes on the virtual spherical surface S1 with reference to the corrected optical axis of the camera 12-1, and reprojects the projected image onto the planes to generate the plurality of base images. Furthermore, the plane projection unit 74 sets the plurality of planes on the virtual spherical surface S2 with reference to the corrected optical axis of the camera 12-2, and reprojects the projected image onto the planes to generate the plurality of reference images.

In step S37, the projective transformation unit 75 applies the projective transformation to each of the reference images on the basis of the projective transformation parameter stored in the parallelization parameter storage unit 55. The projective transformation unit 75 outputs the plurality of base images and the plurality of reference images after projective transformation.

In step S38, the corresponding point search unit 53 performs the corresponding point search for each image pair of the base image and the reference image after projective transformation supplied from the projective transformation unit 75.

In step S39, the distance calculation unit 56 calculates the distance to the target object on the basis of the corresponding points searched by the corresponding point search unit 53.

In step S40, the post-processing unit 57 performs the post-processing on the basis of the distance information calculated by the distance calculation unit 56, and terminates the processing.

The rectification including the two-stage processing of the optical axis correction and the projective transformation as described above is performed every time the distance to the target object is calculated. Thereby, the distance can be calculated with more accuracy.

2. Second Embodiment

In the optical axis correction performed as the first stage processing of the rectification as described above, the processing that may cause the largest error is the detection (estimation) of the optical axis. If the detection of the optical axis has an error and the corrected optical axis cannot be set with high accuracy, the amount of correction in the projective transformation performed as the second stage processing becomes large and there is a possibility that the distortion cannot be corrected.

Here, another processing by an image processing device 11 for generating a parallelization parameter will be described with reference to the flowchart in FIG. 18. The optical axis correction performed as the first stage processing is performed in a form different from the processing described with reference to FIG. 16.

Figure 18:
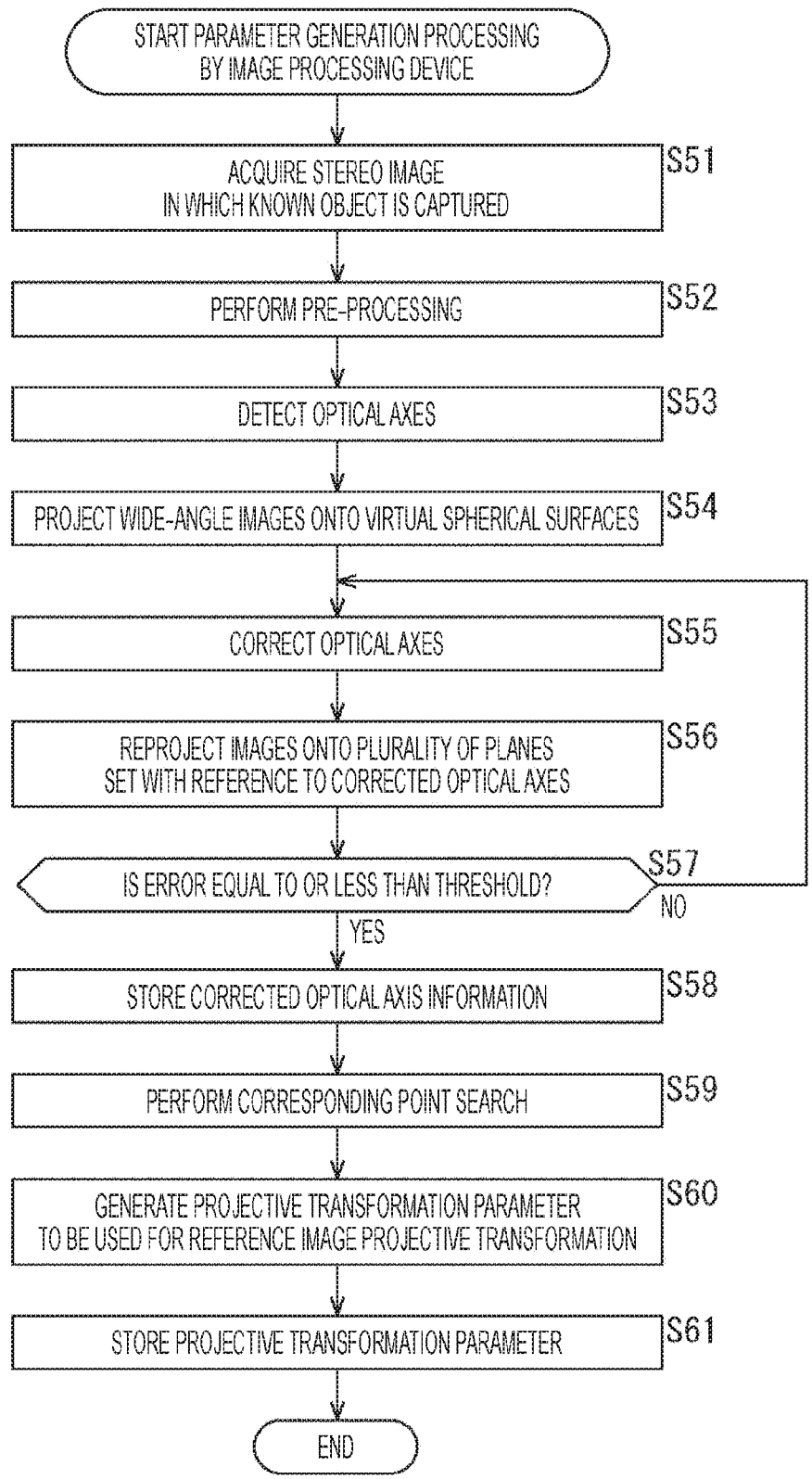
FIG. 18 is a flowchart for describing another parallelization parameter generation processing of the image processing device.

The processing in FIG. 18 is similar to the processing described with reference to FIG. 16, except that evaluation of a correction result of optical axes is performed. Overlapping description will be omitted as appropriate.

A stereo image obtained by capturing a known object prepared for generating a parallelization parameter is input to the image processing device 11. The known object prepared here may be a nearby object as long as the position is fixed. The known object may be an object reflected only in the vicinity of the zenith when projected onto a virtual spherical surface but also an object widely distributed in the entire image.

In step S51, the stereo image is received, and in step S52, pre-processing is applied to wide-angle images constituting the stereo image.

In step S53, an optical axis detection unit 71 of a parallelization processing unit 52 detects an optical axis of a camera 12-1 and an optical axis of a camera 12-2.

In step S54, the virtual spherical surface projection unit 72 projects the wide-angle image captured by the camera 12-1 and the wide-angle image captured by the camera 12-2 onto virtual spherical surfaces.

In step S55, the optical axis correction unit 73 analyzes projected images and detects the positions of the known object on the virtual spherical surfaces. Furthermore, the optical axis correction unit 73 corrects the optical axis by an amount corresponding to a difference between the detected position and a preset position (position at which the known object should be reflected).

In step S56, a plane projection unit 74 sets a plurality of planes on the virtual spherical surfaces with reference to the corrected optical axes, and reprojects the projected images onto the planes to generate a plurality of base images and a plurality of reference images.

In step S57, the optical axis correction unit 73 determines whether or not an optical axis correction error is equal to or less than a threshold.

The optical axis correction error is obtained by, for example, the following expression (5).

[Math. 5]

$$\mathrm{err\_sum1} = \Sigma |y1(i) - y2(i)| \qquad (5)$$

Here, y1(i) represents a y coordinate of a certain object point on the base image. y2(i) represents a y coordinate of the same object point on the reference image. i represents a value from 1 to n and is a serial number of n object points reflected in a planar image.

The fact that there is no error in the optical axis correction means that the same object point reflected in the two fisheye cameras has the same value y, so the difference between the values y should be close to 0. The expression (5) is an evaluation expression based on the sum of positional deviations of the same object point in the y direction between stereo cameras.

Furthermore, the optical axis correction error may be obtained by the following expression (6).

[Math. 6]

$$\mathrm{err\_sum2} = \Sigma |x1(i) + d(i) - y2(i)| + \Sigma |y1(i) - y2(i)| \qquad (6)$$

Here, x1(i) represents an x coordinate of a certain object point on the base image. x2(i) represents an x coordinate of the same object point on the reference image. y1(i), y2(i), and i are similar to the case of the expression (5). A parallax d is a value that can be calculated using the expression (1) from a known distance to the object point.

The expression (6) is to obtain an evaluation value including a positional deviation of the same object point in an x direction as compared with the expression (5).

Another evaluation value may be used instead of using the error obtained by the expressions (5) and (6) as the evaluation value. For example, the part for obtaining the sum of errors in the expression (5) or (6) is used to obtain the sum of squares of the errors, and an evaluation value obtained using by the expression or an evaluation value obtained by using correlation calculation or the like may be used.

Returning to the description of FIG. 18, in a case where it is determined that the optical axis correction error exceeds a threshold in step S57, the processing returns to step S55 and repeats optical axis correction. In the optical axis correction that is repeated performed, correction according to an error may be performed, or correction for shifting the optical axis by only a fixed amount may be performed.

In a case where it is determined that the optical axis correction error is equal to or less than the threshold in step S57, processing of step S58 and subsequent steps is performed. By repeating the optical axis correction until the correction error becomes equal to or less than the threshold, an optical axis with a small error can be obtained as the corrected optical axes.

The processing of step S58 and subsequent steps is similar to the processing of step S6 and the subsequent steps in FIG. 16. With the above processing, rectification can be performed with more accuracy.

3. Third Embodiment

Cameras 12-1 and 12-2, which are fisheye cameras, can capture a wide range. Therefore, there are some cases where a housing to which a stereo camera system 1 is attached is reflected, depending on how the stereo camera system 1 is attached.

For example, in a stereo image in FIG. 2, a vehicle body C of an automobile is reflected as described above. In a case of projecting such a stereo image onto a virtual spherical surface and reprojecting a projected image onto a plurality of planes, the vehicle body C is reflected in each of planar images. Here, when the above-described rectification is performed, the distance to the vehicle body C can be calculated.

When using the stereo camera system 1 that has completed the rectification, distance measurement may not be correctly performed due to distortion due to impact, heat, aging, or the like. In this case, such a problem is solved by performing rectification again.

However, in the rectification before the start of operation described in the first embodiment, a dedicated environment is required because a known pattern that covers the entire screen, for example, is used for the optical axis correction.

Therefore, rerectification may be performed by the method described in the second embodiment, which does not require a dedicated environment. This rerectification is performed at predetermined timing after the start of operation of the stereo camera system 1, for example.

By evaluating an optical axis correction error using the expression (5), a deviation of rectification in a y direction can be eliminated, but a deviation in an x direction may remain. Evaluation of the optical axis correction error in the rerectification is performed using the expression (6).

In the case where evaluation of the optical axis correction error is performed using the expression (6), an object point with a known distance is required. For this known distance, the distance to the housing reflected in the fisheye camera, such as the vehicle body C, can be used.

Here, in the case of using the vehicle body C as the object point with a known distance, the known object point is concentrated into a part of a planar image, such as a position of a lower part of the planar image. For the object point with a known distance, an error is obtained using the expression (6), and for an object point with an unknown distance, an error is obtained using the expression (5), whereby the optical axis correction error can be measured in the entire image.

4. Modification

The cases where the lenses included in the cameras 12-1 and 12-2 are fisheye lenses have been mainly described. However, lenses having a wide viewing angle that are not fisheye lenses may be provided in the cameras 12-1 and 12-2.

Furthermore, in the above description, the reprojection of the wide-angle image projected onto the virtual spherical surface has been performed on the three planes set on the virtual spherical surface. However, reprojection may be performed onto four or more planes set with reference to corrected optical axes.

The image processing device 11 has been provided as a separate device from the camera 12-1 and the camera 12-2 constituting the stereo camera. However, the image processing device 11 may include the camera 12-1 and the camera 12-2, and these devices may be provided in the same housing.

The series of processing described above can be executed by hardware or software. In a case where the series of processing is executed by software, a program constituting the software is installed from a program recording medium into a computer incorporated in dedicated hardware, a general-purpose personal computer, or the like.

Figure 19:
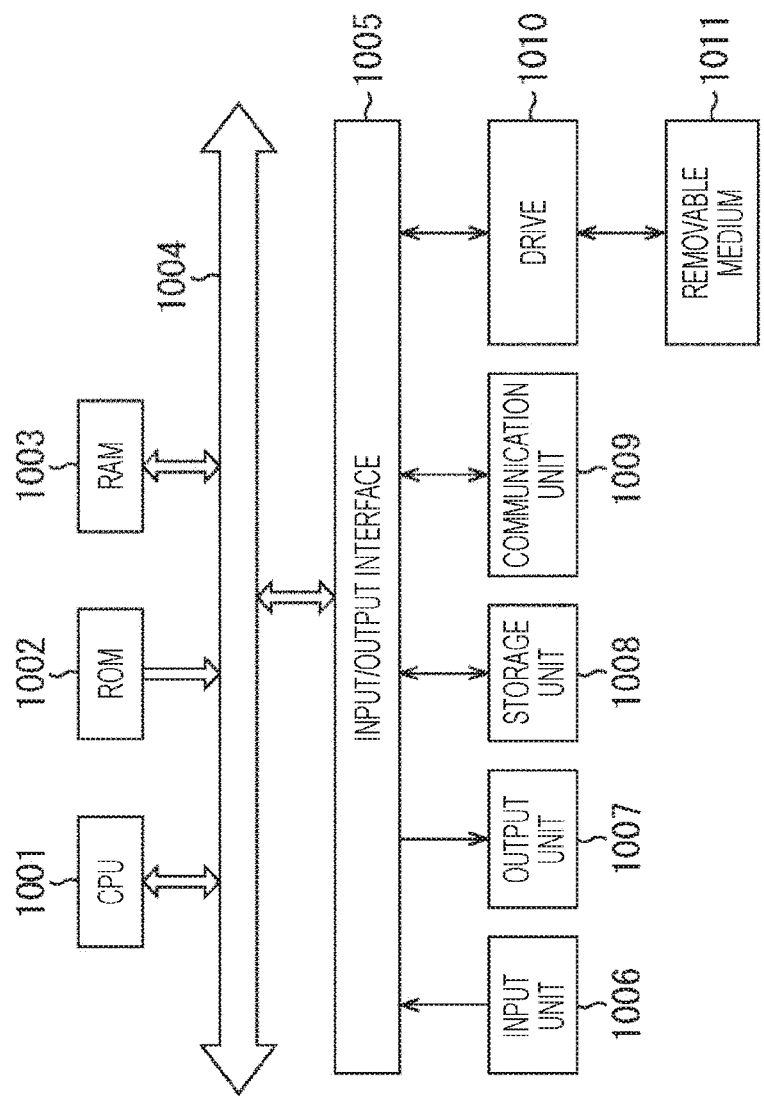
FIG. 19 is a block diagram illustrating a configuration example of a computer.

FIG. 19 is a block diagram illustrating a configuration example of hardware of a computer that executes the above-described series of processing by a program. The image processing device 11 is configured by a computer having the configuration as illustrated in FIG. 19.

A central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006 including a keyboard, a mouse, and the like, and an output unit 1007 including a display, a speaker, and the like are connected to the input/output interface 1005. Furthermore, a storage unit 1008 including a hard disk, a nonvolatile memory, and the like, a communication unit 1009 including a network interface and the like, and a drive 1010 for driving a removable medium 1011 are connected to the input/output interface 1005.

In the computer configured as described above, the CPU 1001 loads, for example, a program stored in the storage unit 1008 into the RAM 1003 and executes the program via the input/output interface 1005 and the bus 1004, so that the above-described series of processing is performed.

The program executed by the CPU 1001 is provided by being recorded on the removable medium 1011 or via a wired or wireless transmission medium such as a local area network, the Internet, or digital broadcasting, and is installed in the storage unit 1008.

Note that the program executed by the computer may be a program processed in chronological order according to the order described in the present specification or may be a program executed in parallel or at necessary timing such as when a call is made.

Embodiments of the present technology are not limited to the above-described embodiments, and various modifications can be made without departing from the gist of the present technology.

Note that the effects described in the present specification are merely examples and are not limited, and other effects may be exhibited.

5. Application 1

The technology according to the present disclosure can be applied to various products. For example, the technology according to the present disclosure may be applied to an endoscopic surgical system. The stereo camera system 1 is used as a part of the endoscopic surgical system.

Figure 20:
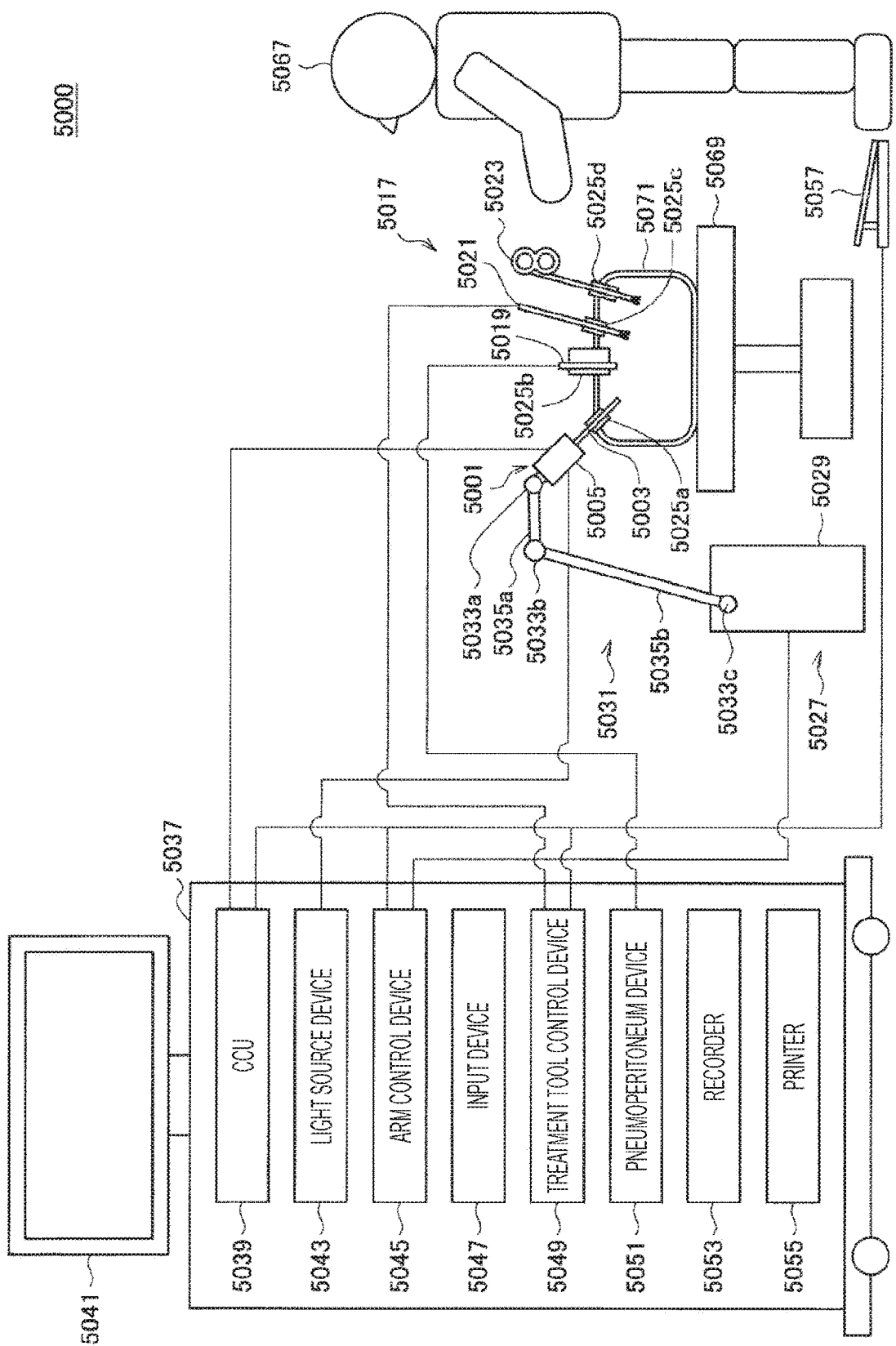
FIG. 20 is a diagram illustrating an example of a schematic configuration of an endoscopic surgical system.

FIG. 20 is a diagram illustrating an example of a schematic configuration of an endoscopic surgical system 5000 to which the technology according to the present disclosure is applicable. FIG. 20 illustrates a state in which an operator (surgeon) 5067 is performing surgery for a patient 5071 on a patient bed 5069, using the endoscopic surgical system 5000. As illustrated, the endoscopic surgical system 5000 includes an endoscope 5001, other surgical tools 5017, a support arm device 5027 that supports the endoscope 5001, and a cart 5037 in which various devices for endoscopic surgery are mounted.

In endoscopic surgery, a plurality of cylindrical puncture instruments called trocars 5025a to 5025d is punctured into an abdominal wall instead of cutting the abdominal wall and opening the abdomen. Then, a lens barrel 5003 of the endoscope 5001 and other surgical tools 5017 are inserted into a body cavity of the patient 5071 through the trocars 5025a to 5025d. In the illustrated example, as the other surgical tools 5017, a pneumoperitoneum tube 5019, an energy treatment tool 5021, and a forceps 5023 are inserted into the body cavity of the patient 5071. Furthermore, the energy treatment tool 5021 is a treatment tool for performing incision and detachment of tissue, sealing of a blood vessel, and the like with a high-frequency current or an ultrasonic vibration. Note that the illustrated surgical tools 5017 are mere examples, and various kinds of surgical tools typically used in endoscopic surgery such as tweezers and a retractor may be used as the surgical tool 5017.

An image of an operation site in the body cavity of the patient 5071 captured by the endoscope 5001 is displayed on a display device 5041. The operator 5067 performs treatment such as removal of an affected part, for example, using the energy treatment tool 5021 and the forceps 5023 while viewing the image of the operation site displayed on the display device 5041 in real time. Note that the pneumoperitoneum tube 5019, the energy treatment tool 5021, and the forceps 5023 are supported by the operator 5067, an assistant, or the like during surgery, although illustration is omitted.

(Support Arm Device)

The support arm device 5027 includes an arm unit 5031 extending from a base unit 5029. In the illustrated example, the arm unit 5031 includes joint units 5033*a*, 5033*b*, and 5033*c*, and links 5035*a* and 5035*b*, and is driven under the control of an arm control device 5045. The endoscope 5001 is supported by the arm unit 5031, and the position and posture of the endoscope 5001 are controlled. With the control, stable fixation of the position of the endoscope 5001 can be realized.

(Endoscope)

The endoscope 5001 includes the lens barrel 5003 and a camera head 5005. A region having a predetermined length from a distal end of the lens barrel 5003 is inserted into the body cavity of the patient 5071. The camera head 5005 is connected to a proximal end of the lens barrel 5003. In the illustrated example, the endoscope 5001 configured as a so-called hard endoscope including the hard lens barrel 5003 is illustrated. However, the endoscope 5001 may be configured as a so-called soft endoscope including the soft lens barrel 5003.

An opening portion in which an object lens is fit is provided in the distal end of the lens barrel 5003. A light source device 5043 is connected to the endoscope 5001, and light generated by the light source device 5043 is guided to the distal end of the lens barrel 5003 by a light guide extending inside the lens barrel 5003 and an observation target in the body cavity of the patient 5071 is irradiated with the light through the object lens. Note that the endoscope 5001 may be a forward-viewing endoscope, an oblique-viewing endoscope, or a side-viewing endoscope.

An optical system and an imaging element are provided inside the camera head 5005, and reflected light (observation light) from the observation target is condensed to the imaging element by the optical system. The observation light is photoelectrically converted by the imaging element, and an electrical signal corresponding to the observation light, in other words, an image signal corresponding to an observed image is generated. The image signal is transmitted to a camera control unit (CCU) 5039 as raw data. Note that the camera head 5005 has a function to adjust magnification and a focal length by appropriately driving the optical system.

Note that a plurality of the imaging elements may be provided in the camera head 5005 to support three-dimensional (3D) display, and the like, for example. In this case, a plurality of relay optical systems is provided inside the lens barrel 5003 to guide the observation light to each of the plurality of imaging elements.

(Various Devices Mounted in Cart)

The CCU 5039 includes a central processing unit (CPU), a graphics processing unit (GPU), and the like, and centrally controls the operation of the endoscope 5001 and the display device 5041. Specifically, the CCU 5039 receives the image signal from the camera head 5005, and applies various types of image processing for displaying an image based on the image signal, such as developing processing (demosaicing processing), for example, to the image signal. The CCU 5039 provides the image signal to which the image processing has been applied to the display device 5041. Furthermore, the CCU 5039 transmits a control signal to the camera head 5005 to control its driving. The control signal may include information regarding imaging conditions such as the magnification and focal length.

The display device 5041 displays an image based on the image signal to which the image processing has been applied by the CCU 5039, under the control of the CCU 5039. In a case where the endoscope 5001 supports high-resolution capturing such as 4K (horizontal pixel number 3840×vertical pixel number 2160) or 8K (horizontal pixel number 7680×vertical pixel number 4320), and/or in a case where the endoscope 5001 supports 3D display, for example, the display device 5041, which can perform high-resolution display and/or 3D display, can be used corresponding to each case. In a case where the endoscope 5001 supports the high-resolution capturing such as 4K or 8K, a greater sense of immersion can be obtained by use of the display device 5041 with the size of 55 inches or more. Furthermore, a plurality of display devices 5041 having different resolutions and sizes may be provided depending on the application.

The light source device 5043 includes a light source such as a light emitting diode (LED) for example, and supplies irradiation light to the endoscope 5001 in capturing an operation portion.

The arm control device 5045 includes a processor such as a CPU, and is operated according to a predetermined program, thereby controlling drive of the arm unit 5031 of the support arm device 5027 according to a predetermined control method.

An input device 5047 is an input interface for the endoscopic surgical system 5000. The user can input various types of information and instructions to the endoscopic surgical system 5000 through the input device 5047. For example, the user inputs various types of information regarding surgery, such as patient's physical information and information of an operative procedure of the surgery, through the input device 5047. Furthermore, for example, the user inputs an instruction to drive the arm unit 5031, an instruction to change the imaging conditions (such as the type of the irradiation light, the magnification, and the focal length) of the endoscope 5001, an instruction to drive the energy treatment tool 5021, or the like through the input device 5047.

The type of the input device 5047 is not limited, and the input device 5047 may be one of various known input devices. For example, a mouse, a keyboard, a touch panel, a switch, a foot switch 5057, a lever, and/or the like can be applied to the input device 5047. In a case where a touch panel is used as the input device 5047, the touch panel may be provided on a display surface of the display device 5041.

Alternatively, the input device 5047 is a device worn by the user, such as a glass-type wearable device or a head mounted display (HMD), for example, and various inputs are performed according to a gesture or a line-of-sight of the user detected by the device. Furthermore, the input device 5047 includes a camera capable of detecting a movement of the user, and various inputs are performed according to a gesture or a line-of-sight of the user detected from a video captured by the camera. Moreover, the input device 5047 includes a microphone capable of collecting a voice of the user, and various inputs are performed by an audio through the microphone. In this way, the input device 5047 is configured to be able to input various types of information in a non-contact manner, whereby the user (for example, the operator 5067) in particular belonging to a clean area can operate a device belonging to a filthy area in a non-contact manner. Furthermore, since the user can operate the device without releasing his/her hand from the possessed surgical tool, the user's convenience is improved.

A treatment tool control device 5049 controls drive of the energy treatment tool 5021 for cauterization and incision of tissue, sealing of a blood vessel, and the like. A pneumoperitoneum device 5051 sends a gas into the body cavity of the patient 5071 through the pneumoperitoneum tube 5019 to expand the body cavity for the purpose of securing a field of view by the endoscope 5001 and a work space for the operator. A recorder 5053 is a device that can record various types of information regarding the surgery. A printer 5055 is a device that can print the various types of information regarding the surgery in various formats such as a text, an image, or a graph.

Hereinafter, a particularly characteristic configuration in the endoscopic surgical system 5000 will be further described in detail.

(Support Arm Device)

The support arm device 5027 includes the base unit 5029 as a base and the arm unit 5031 extending from the base unit 5029. In the illustrated example, the arm unit 5031 includes the plurality of joint units 5033a, 5033b, and 5033c and the plurality of links 5035a and 5035b connected by the joint unit 5033b, but FIG. 20 illustrates the configuration of the arm unit 5031 in a simplified manner for simplification. In reality, the shapes, the number, and the arrangement of the joint units 5033a to 5033c and the links 5035a and 5035b, the directions of rotation axes of the joint units 5033a to 5033c, and the like can be appropriately set so that the arm unit 5031 has a desired degree of freedom. For example, the arm unit 5031 can be favorably configured to have six degrees of freedom or more. With the configuration, the endoscope 5001 can be freely moved within a movable range of the arm unit 5031. Therefore, the lens barrel 5003 of the endoscope 5001 can be inserted from a desired direction into the body cavity of the patient 5071.

Actuators are provided in the joint units 5033a to 5033c, and the joint units 5033a to 5033c are configured to be rotatable around a predetermined rotation axis by driving of the actuators. The driving of the actuators is controlled by the arm control device 5045, whereby rotation angles of the joint units 5033a to 5033c are controlled and driving of the arm unit 5031 is controlled. With the control, control of the position and posture of the endoscope 5001 can be realized. At this time, the arm control device 5045 can control the drive of the arm unit 5031 by various known control methods such as force control or position control.

For example, the driving of the arm unit 5031 may be appropriately controlled by the arm control device 5045 according to an operation input, and the position and posture of the endoscope 5001 may be controlled, by an appropriate operation input by the operator 5067 via the input device 5047 (including the foot switch 5057). With the control, the endoscope 5001 at the distal end of the arm unit 5031 can be moved from an arbitrary position to an arbitrary position, and then can be fixedly supported at the position after the movement. Note that the arm unit 5031 may be operated by a so-called master-slave system. In this case, the arm unit 5031 can be remotely operated by the user via the input device 5047 installed at a place distant from an operating room.

Furthermore, in a case where the force control is applied, the arm control device 5045 may perform so-called power assist control in which the arm control device 5045 receives an external force from the user and drives the actuators of the joint units 5033a to 5033c so that the arm unit 5031 is smoothly moved according to the external force. With the control, the user can move the arm unit 5031 with a relatively light force when moving the arm unit 5031 while being in direct contact with the arm unit 5031. Accordingly, the user can more intuitively move the endoscope 5001 with a simpler operation, and the user's convenience can be improved.

Here, in endoscopic surgery, the endoscope 5001 has been generally supported by a surgeon called scopist. In contrast, by use of the support arm device 5027, the position of the endoscope 5001 can be reliably fixed without manual operation, and thus an image of the operation site can be stably obtained and the surgery can be smoothly performed.

Note that the arm control device 5045 is not necessarily provided in the cart 5037. Furthermore, the arm control device 5045 is not necessarily one device. For example, the arm control device 5045 may be provided in each of the joint units 5033a to 5033c of the arm unit 5031 of the support arm device 5027, and the drive control of the arm unit 5031 may be realized by mutual cooperation of the plurality of arm control devices 5045.

(Light Source Device)

The light source device 5043 supplies irradiation light, which is used in capturing an operation site, to the endoscope 5001. The light source device 5043 includes, for example, an LED, a laser light source, or a white light source configured by a combination thereof. In a case where the white light source is configured by a combination of RGB laser light sources, output intensity and output timing of the respective colors (wavelengths) can be controlled with high accuracy. Therefore, white balance of a captured image can be adjusted in the light source device 5043. Furthermore, in this case, the observation target is irradiated with the laser light from each of the RGB laser light sources in a time division manner, and the drive of the imaging element of the camera head 5005 is controlled in synchronization with the irradiation timing, so that images respectively corresponding to RGB can be captured in a time division manner. According to the method, a color image can be obtained without providing a color filter to the imaging element.

Furthermore, drive of the light source device 5043 may be controlled to change intensity of light to be output every predetermined time. The drive of the imaging element of the camera head 5005 is controlled in synchronization with change timing of the intensity of light, and images are acquired in a time division manner and are synthesized, whereby a high-dynamic range image without blocked up shadows and flared highlights can be generated.

Furthermore, the light source device 5043 may be configured to be able to supply light in a predetermined wavelength band corresponding to special light observation. In the special light observation, for example, so-called narrow band imaging is performed by radiating light in a narrower band than the irradiation light (in other words, white light) at the time of normal observation, using wavelength dependence of absorption of light in a body tissue, to capture a predetermined tissue such as a blood vessel in a mucosal surface layer at high contrast. Alternatively, in the special light observation, fluorescence observation to obtain an image by fluorescence generated by radiation of exciting light may be performed. In the fluorescence observation, irradiating the body tissue with exciting light to observe fluorescence from the body tissue (self-fluorescence observation), injecting a reagent such as indocyanine green (ICG) into the body tissue and irradiating the body tissue with exciting light corresponding to a fluorescence wavelength of the reagent to obtain a fluorescence image, or the like can be performed. The light source device 5043 can be configured to be able to supply narrow-band light and/or exciting light corresponding to such special light observation.

(Camera Head and CCU)

Figure 21:
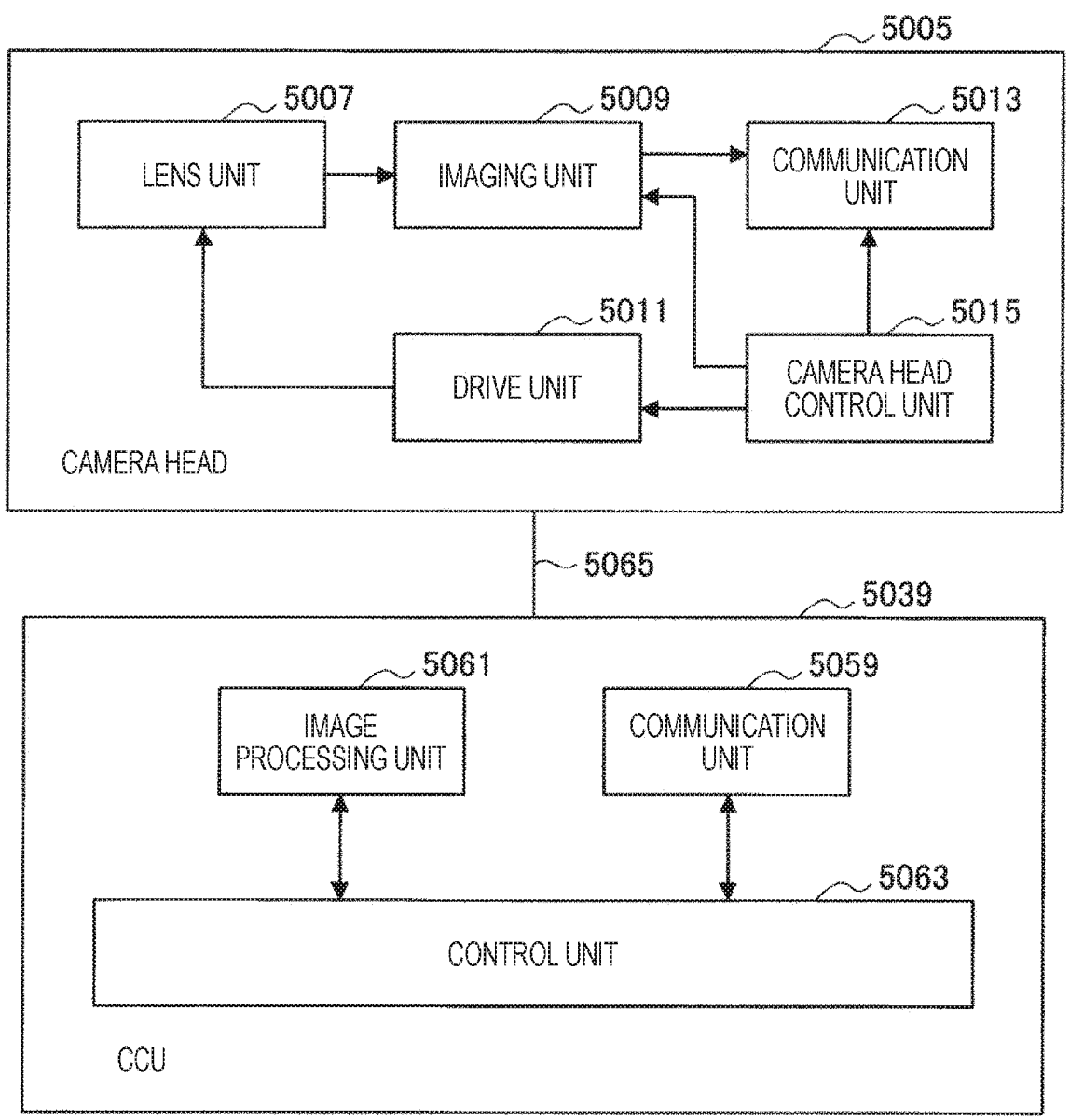
FIG. 21 is a block diagram illustrating an example of functional configurations of a camera head and a CCU illustrated in FIG. 20.

Functions of the camera head 5005 and the CCU 5039 of the endoscope 5001 will be described in more detail with reference to FIG. 21. FIG. 21 is a block diagram illustrating an example of functional configurations of the camera head 5005 and the CCU 5039 illustrated in FIG. 20.

Referring to FIG. 21, the camera head 5005 includes a lens unit 5007, an imaging unit 5009, a drive unit 5011, a communication unit 5013, and a camera head control unit 5015 as its functions. Furthermore, the CCU 5039 includes a communication unit 5059, an image processing unit 5061, and a control unit 5063 as its functions. The camera head 5005 and the CCU 5039 are communicatively connected with each other by a transmission cable 5065.

First, a functional configuration of the camera head 5005 will be described. The lens unit 5007 is an optical system provided in a connection portion between the lens unit 5007 and the lens barrel 5003. Observation light taken through the distal end of the lens barrel 5003 is guided to the camera head 5005 and enters the lens unit 5007. The lens unit 5007 is configured by a combination of a plurality of lenses including a zoom lens and a focus lens. Optical characteristics of the lens unit 5007 are adjusted to condense the observation light on a light receiving surface of an imaging element of the imaging unit 5009. Furthermore, the zoom lens and the focus lens are configured to have their positions on the optical axis movable for adjustment of the magnification and focal point of the captured image.

The imaging unit 5009 includes an imaging element, and is disposed at a rear stage of the lens unit 5007. The observation light having passed through the lens unit 5007 is focused on the light receiving surface of the imaging element, and an image signal corresponding to the observed image is generated by photoelectric conversion. The image signal generated by the imaging unit 5009 is provided to the communication unit 5013.

As the imaging element constituting the imaging unit 5009, for example, a complementary metal oxide semiconductor (CMOS)-type image sensor having Bayer arrangement and capable of color capturing is used. Note that, as the imaging element, for example, an imaging element that can capture a high-resolution image of 4K or more may be used. By obtainment of the image of the operation site with high resolution, the operator 5067 can grasp the state of the operation site in more detail and can more smoothly advance the surgery.

Furthermore, the imaging element constituting the imaging unit 5009 includes a pair of imaging elements for respectively obtaining image signals for right eye and for left eye corresponding to 3D display. With the 3D display, the operator 5067 can more accurately grasp the depth of biological tissue in the operation site. Note that, in a case where the imaging unit 5009 is configured as a multi-plate imaging unit, a plurality of systems of the lens units 5007 is provided corresponding to the imaging elements.

Furthermore, the imaging unit 5009 may not be necessarily provided in the camera head 5005. For example, the imaging unit 5009 may be provided immediately after the object lens inside the lens barrel 5003.

The drive unit 5011 includes an actuator, and moves the zoom lens and the focus lens of the lens unit 5007 by a predetermined distance along an optical axis by the control of the camera head control unit 5015. With the movement, the magnification and focal point of the captured image by the imaging unit 5009 can be appropriately adjusted.

The communication unit 5013 includes a communication device for transmitting or receiving various types of information to or from the CCU 5039. The communication unit 5013 transmits the image signal obtained from the imaging unit 5009 to the CCU 5039 through the transmission cable 5065 as raw data. At this time, to display the captured image of the operation site with low latency, the image signal is favorably transmitted by optical communication. This is because, in surgery, the operator 5067 performs surgery while observing the state of the affected part with the captured image, and thus display of a moving image of the operation site in as real time as possible is demanded for more safe and reliable surgery. In the case of the optical communication, a photoelectric conversion module that converts an electrical signal into an optical signal is provided in the communication unit 5013. The image signal is converted into the optical signal by the photoelectric conversion module, and is then transmitted to the CCU 5039 via the transmission cable 5065.

Furthermore, the communication unit 5013 receives a control signal for controlling drive of the camera head 5005 from the CCU 5039. The control signal includes information regarding the imaging conditions such as information for specifying a frame rate of the captured image, information for specifying an exposure value at the time of imaging, and/or information for specifying the magnification and the focal point of the captured image, for example. The communication unit 5013 provides the received control signal to the camera head control unit 5015. Note that the control signal from that CCU 5039 may also be transmitted by the optical communication. In this case, the communication unit 5013 is provided with a photoelectric conversion module that converts an optical signal into an electrical signal, and the control signal is converted into an electrical signal by the photoelectric conversion module and is then provided to the camera head control unit 5015.

Note that the imaging conditions such as the frame rate, exposure value, magnification, and focal point are automatically set by the control unit 5063 of the CCU 5039 on the basis of the acquired image signal. That is, a so-called auto exposure (AE) function, an auto focus (AF) function, and an auto white balance (AWB) function are incorporated in the endoscope 5001.

The camera head control unit 5015 controls the drive of the camera head 5005 on the basis of the control signal received from the CCU 5039 through the communication unit 5013. For example, the camera head control unit 5015 controls drive of the imaging element of the imaging unit 5009 on the basis of the information for specifying the frame rate of the captured image and/or the information for specifying exposure at the time of imaging. Furthermore, for example, the camera head control unit 5015 appropriately moves the zoom lens and the focus lens of the lens unit 5007 via the drive unit 5011 on the basis of the information for specifying the magnification and focal point of the captured image. The camera head control unit 5015 may further have a function to store information for identifying the lens barrel 5003 and the camera head 5005.

Note that the configuration of the lens unit 5007, the imaging unit 5009, and the like is arranged in a hermetically sealed structure having high airtightness and waterproofness, whereby the camera head 5005 can have resistance to autoclave sterilization processing.

Next, a functional configuration of the CCU 5039 will be described. The communication unit 5059 includes a communication device for transmitting or receiving various types of information to or from the camera head 5005. The communication unit 5059 receives the image signal transmitted from the camera head 5005 through the transmission cable 5065. At this time, as described above, the image signal can be favorably transmitted by the optical communication. In this case, the communication unit 5059 is provided with a photoelectric conversion module that converts an optical signal into an electrical signal, corresponding to the optical communication. The communication unit 5059 provides the image signal converted into the electrical signal to the image processing unit 5061.

Furthermore, the communication unit 5059 transmits a control signal for controlling drive of the camera head 5005 to the camera head 5005. The control signal may also be transmitted by the optical communication.

The image processing unit 5061 applies various types of image processing to the image signal as raw data transmitted from the camera head 5005. The image processing include various types of known signal processing such as development processing, high image quality processing (such as band enhancement processing, super resolution processing, noise reduction (NR) processing, and/or camera shake correction processing), and/or enlargement processing (electronic zoom processing), for example. Furthermore, the image processing unit 5061 performs wave detection processing for image signals for performing AE, AF, and AWB.

The image processing unit 5061 is configured by a processor such as a CPU or a GPU, and the processor is operated according to a predetermined program, whereby the above-described image processing and wave detection processing can be performed. Note that in a case where the image processing unit 5061 includes a plurality of GPUs, the image processing unit 5061 appropriately divides the information regarding the image signal and performs the image processing in parallel by the plurality of GPUs.

The control unit 5063 performs various types of control related to imaging of the operation site by the endoscope 5001 and display of the captured image. For example, the control unit 5063 generates a control signal for controlling driving of the camera head 5005. At this time, in a case where the imaging conditions are input by the user, the control unit 5063 generates the control signal on the basis of the input by the user. Alternatively, in a case where the AE function, the AF function, and the AWB function are incorporated in the endoscope 5001, the control unit 5063 appropriately calculates optimum exposure value, focal length, and white balance according to a result of the wave detection processing by the image processing unit 5061, and generates the control signal.

Furthermore, the control unit 5063 displays the image of the operation site on the display device 5041 on the basis of the image signal to which the image processing has been applied by the image processing unit 5061. At this time, the control unit 5063 recognizes various objects in the image of the operation site, using various image recognition technologies. For example, the control unit 5063 can recognize a surgical instrument such as forceps, a specific living body portion, blood, mist at the time of use of the energy treatment tool 5021, or the like, by detecting a shape of an edge, a color or the like of an object included in the operation site image. The control unit 5063 superimposes and displays various types of surgery support information on the image of the operation site, in displaying the image of the operation site on the display device 5041 using the result of recognition. The surgery support information is superimposed, displayed, and presented to the operator 5067, so that the surgery can be more safely and reliably advanced.

The transmission cable 5065 that connects the camera head 5005 and the CCU 5039 is an electrical signal cable supporting communication of electrical signals, an optical fiber supporting optical communication, or a composite cable thereof.

Here, in the illustrated example, the communication has been performed in a wired manner using the transmission cable 5065. However, the communication between the camera head 5005 and the CCU 5039 may be wirelessly performed. In a case where the communication between the camera head 5005 and the CCU 5039 is wirelessly performed, it is unnecessary to lay the transmission cable 5065 in the operating room. Therefore, the situation in which movement of medical staffs in the surgery room is hindered by the transmission cable 5065 can be eliminated.

The example of the endoscopic surgical system 5000 to which the technology according to the present disclosure is applicable has been described. Note that, here, the endoscopic surgical system 5000 has been described as an example. However, a system to which the technology according to the present disclosure is applicable is not limited to this example. For example, the technology according to the present disclosure may be applied to a flexible endoscopic system for examination or a microsurgical system.

The technology according to the present disclosure is favorably applied to the case where the camera provided in the camera head 5005 is a stereo camera provided with a fisheye lens, and an image captured by the stereo camera is processed. By applying the technology according to the present disclosure, the distance to the target object point can be accurately measured. Therefore, the surgery can be more safely and more reliably performed.

6. Application 2

Furthermore, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot, a construction machine, an agricultural machine (tractor), and the like.

Figure 22:
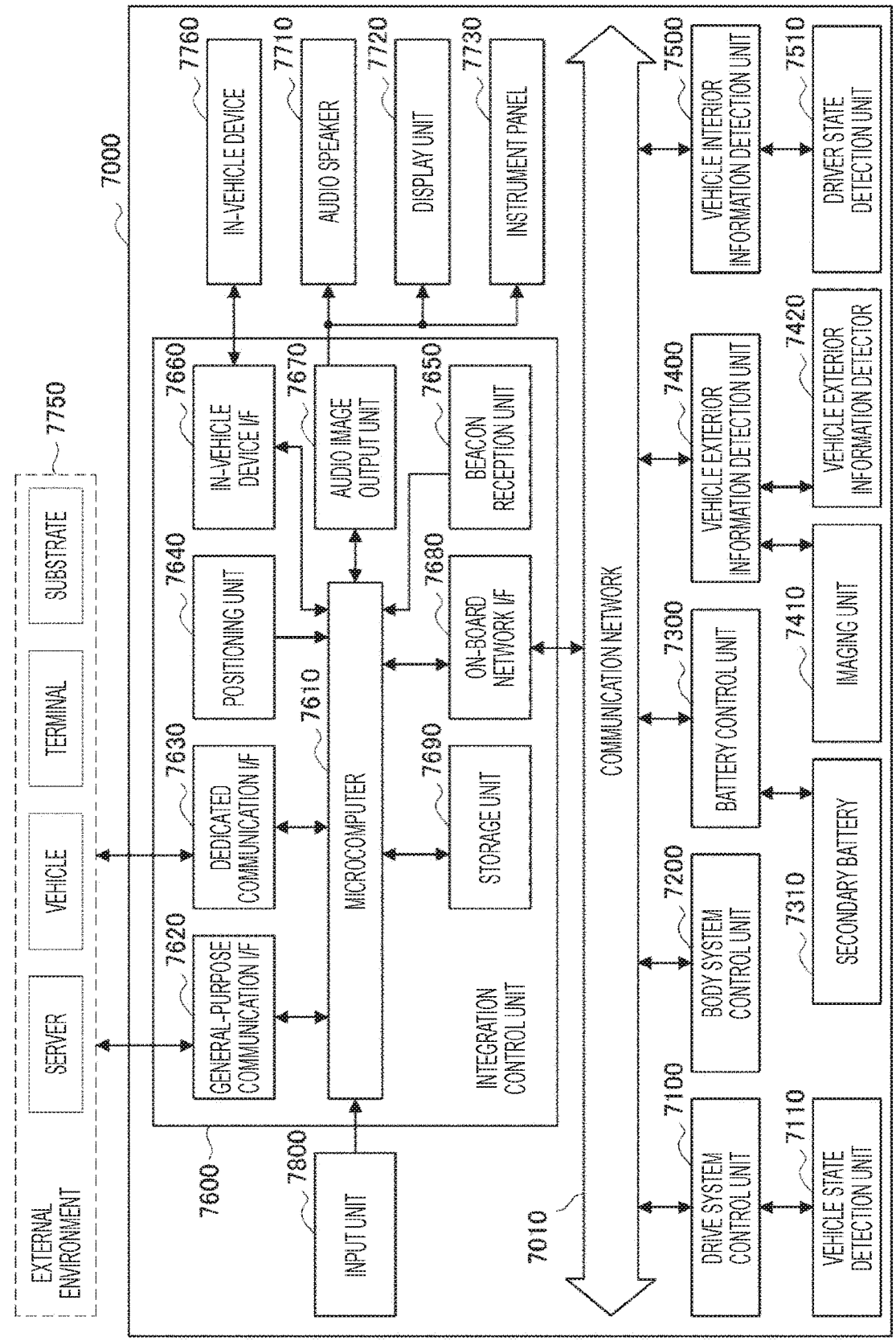
FIG. 22 is a block diagram illustrating an example of a schematic configuration of a vehicle control system.

FIG. 22 is a block diagram illustrating a schematic configuration example of a vehicle control system 7000 as an example of a moving body control system to which the technology according to the present disclosure is applicable. A vehicle control system 7000 includes a plurality of electronic control units connected through a communication network 7010. In the example illustrated in FIG. 22, the vehicle control system 7000 includes a drive system control unit 7100, a body system control unit 7200, a battery control unit 7300, a vehicle exterior information detection unit 7400, a vehicle interior information detection unit 7500, and an integration control unit 7600. The communication network 7010 that connects the plurality of control units may be, for example, an on-board communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, and the like, and a drive circuit that drives various devices to be controlled. Each control unit includes a network I/F for communicating with another control unit via the communication network 7010 and a communication I/F for communicating with a device, a sensor, or the like inside and outside the vehicle by wired communication or wireless communication. FIG. 22 illustrates, as functional configurations of the integration control unit 7600, a microcomputer 7610, a general-purpose communication I/F 7620, a dedicated communication I/F 7630, a positioning unit 7640, a beacon reception unit 7650, an in-vehicle device I/F 7660, an audio image output unit 7670, an on-board network I/F 7680, and a storage unit 7690. Similarly, the other control units include a microcomputer, a communication I/F, a storage unit, and the like.

The drive system control unit 7100 controls operations of devices regarding a drive system of a vehicle according to various programs. For example, the drive system control unit 7100 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like. The drive system control unit 7100 may have a function as a control device of an antilock brake system (ABS), electronic stability control (ESC), or the like.

The drive system control unit 7100 is connected with a vehicle state detection unit 7110. The vehicle state detection unit 7110 includes, for example, at least one of a gyro sensor for detecting angular velocity of an axial rotational motion of a vehicle body, an acceleration sensor for detecting acceleration of the vehicle, or a sensor for detecting an operation amount of an accelerator pedal, an operation amount of a brake pedal, a steering angle of a steering wheel, an engine speed, rotation speed of a wheel, or the like. The drive system control unit 7100 performs arithmetic processing using a signal input from the vehicle state detection unit 7110 and controls the internal combustion engine, the drive motor, an electric power steering device, a brake device, or the like.

The body system control unit 7200 controls operations of various devices equipped in the vehicle body according to various programs. For example, the body system control unit 7200 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 7200. The body system control unit 7200 receives an input of the radio waves or the signals, and controls a door lock device, the automatic window device, the lamps, and the like of the vehicle.

The battery control unit 7300 controls a secondary battery 7310 that is a power supply source of the drive motor according to various programs. For example, the battery control unit 7300 receives information such as a battery temperature, a battery output voltage, or a remaining capacity of the battery from a battery device including the secondary battery 7310. The battery control unit 7300 performs arithmetic processing using these signals to control temperature adjustment of the secondary battery 7310, a cooling device provided in the battery device, or the like.

The vehicle exterior information detection unit 7400 detects information outside the vehicle that mounts the vehicle control system 7000. For example, at least one of an imaging unit 7410 or a vehicle exterior information detector 7420 is connected to the vehicle exterior information detection unit 7400. The imaging unit 7410 includes at least one of a time of flight (ToF) camera, a stereo camera, a monocular camera, an infrared camera, or another camera. The vehicle exterior information detector 7420 includes, for example, at least one of an environmental sensor for detecting current weather or atmospheric phenomena or an ambient information detection sensor for detecting other vehicles, obstacles, pedestrians, and the like around the vehicle equipped with the vehicle control system 7000.

The environmental sensor may be, for example, at least one of a raindrop sensor for detecting rainy weather, a fog sensor for detecting fog, a sunshine sensor for detecting the degree of sunshine, or a snow sensor for detecting snowfall. The ambient information detection sensor may be at least one of an ultrasonic sensor, a radar device, or a light detection and ranging or laser imaging detection and ranging (LIDAR) device. The imaging unit 7410 and the vehicle exterior information detector 7420 may be provided as independent sensors or devices, respectively, or may be provided as devices in which a plurality of sensors or devices is integrated.

Figure 23:
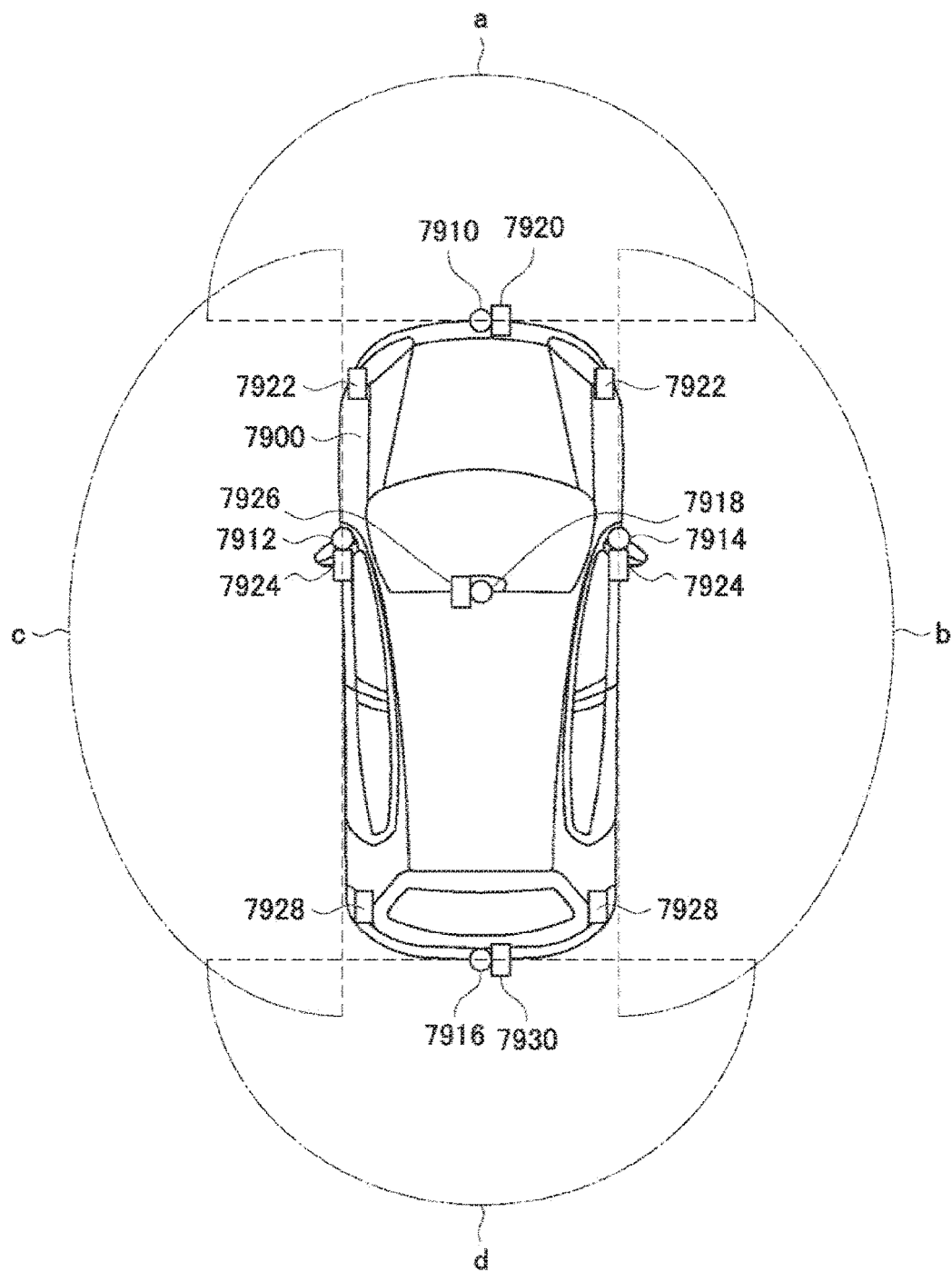
FIG. 23 is an explanatory diagram illustrating an example of installation positions of a vehicle exterior information detection unit and an imaging unit.

Here, FIG. 23 illustrates an example of installation positions of the imaging unit 7410 and the vehicle exterior information detector 7420. Each of imaging units 7910, 7912, 7914, 7916, and 7918 is provided on at least one position of a front nose, side mirrors, a rear bumper, a back door, or an upper portion of a windshield in an interior of a vehicle 7900, for example. The imaging unit 7910 provided at the front nose and the imaging unit 7918 provided at the upper portion of the windshield in an interior of the vehicle mainly acquire front images of the vehicle 7900. The imaging units 7912 and 7914 provided at the side mirrors mainly acquire side images of the vehicle 7900. The imaging unit 7916 provided at the rear bumper or the back door mainly acquires a rear image of the vehicle 7900. The imaging unit 7918 provided at the upper portion of the windshield in the interior of the vehicle is mainly used for detecting a preceding vehicle, a pedestrian, an obstacle, a traffic signal, a traffic sign, a lane, or the like.

Note that FIG. 23 illustrates an example of capture ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, and an imaging range d indicates an imaging range of the imaging unit 7916 provided at the rear bumper or the back door. For example, a bird's-eye view image of the vehicle 7900 as viewed from above can be obtained by superimposing image data imaged in the imaging units 7910, 7912, 7914, and 7916.

Vehicle exterior information detectors 7920, 7922, 7924, 7926, 7928, and 7930 provided at the front, rear, side, corner, and upper portion of the windshield in the interior of the vehicle 7900 may be ultrasonic sensors or radar devices, for example. Vehicle exterior information detectors 7920, 7926, and 7930 provided at the front nose, the rear bumper, the back door, and the upper portion of the windshield in the interior of the vehicle 7900 may be LIDAR devices, for example. These vehicle exterior information detectors 7920 to 7930 are mainly used for detecting a preceding vehicle, a pedestrian, an obstacle, and the like.

Referring back to FIG. 22, the description will be continued. The vehicle exterior information detection unit 7400 causes the imaging unit 7410 to image an image outside the vehicle, and receives the imaged image. Furthermore, the vehicle exterior information detection unit 7400 receives detection information from the connected vehicle exterior information detector 7420. In a case where the vehicle exterior information detector 7420 is an ultrasonic sensor, a radar device, or an LIDAR device, the vehicle exterior information detection unit 7400 transmits ultrasonic waves, electromagnetic waves, or the like and receives information of received reflected waves. The vehicle exterior information detection unit 7400 may perform object detection processing or distance detection processing of persons, vehicles, obstacles, signs, letters or the like on a road surface on the basis of the received image. The vehicle exterior information detection unit 7400 may perform environment recognition processing of recognizing rainfall, fog, a road surface condition, or the like on the basis of the received information. The vehicle exterior information detection unit 7400 may calculate the distance to the object outside the vehicle on the basis of the received information.

Furthermore, the vehicle exterior information detection unit 7400 may perform image recognition processing or distance detection processing of recognizing persons, vehicles, obstacles, signs, letters, or the like on a road surface on the basis of the received image data. The vehicle exterior information detection unit 7400 may perform processing such as distortion correction or alignment for the received image data and combine the image data imaged by different imaging units 7410 to generate a bird's-eye view image or a panoramic image. The vehicle exterior information detection unit 7400 may perform viewpoint conversion processing using the image data imaged by the different imaging units 7410.

The vehicle interior information detection unit 7500 detects information inside the vehicle. A driver state detection unit 7510 that detects a state of a driver is connected to the vehicle interior information detection unit 7500, for example. The driver state detection unit 7510 may include a camera for imaging the driver, a biometric sensor for detecting biological information of the driver, a microphone for collecting sounds in the interior of the vehicle, and the like. The biometric sensor is provided, for example, on a seating surface, a steering wheel, or the like, and detects the biological information of an occupant sitting on a seat or the driver holding the steering wheel. The vehicle interior information detection unit 7500 may calculate the degree of fatigue or the degree of concentration of the driver or may determine whether or not the driver falls asleep at the wheel on the basis of detection information input from the driver state detection unit 7510. The vehicle interior information detection unit 7500 may perform processing such as noise canceling processing for collected sound signals.

The integration control unit 7600 controls the overall operation in the vehicle control system 7000 according to various programs. The integration control unit 7600 is connected with an input unit 7800. The input unit 7800 is realized by, a device that can be operated and input by an occupant, such as a touch panel, a button, a microphone, a switch, or a lever, for example. Data obtained by recognizing sounds input by the microphone may be input to the integration control unit 7600. The input unit 7800 may be, for example, a remote control device using an infrared ray or another radio wave, or may be an externally connected device such as a mobile phone or a personal digital assistant (PDA) corresponding to the operation of the vehicle control system 7000. The input unit 7800 may be, for example, a camera, and in this case, the occupant can input information by gesture. Alternatively, data obtained by detecting movement of a wearable device worn by the occupant may be input. Moreover, the input unit 7800 may include, for example, an input control circuit that generates an input signal on the basis of the information input by the occupant or the like using the above input unit 7800 and outputs the input signal to the integration control unit 7600, and the like. The occupant or the like inputs various data to and instructs the vehicle control system 7000 on a processing operation by operating the input unit 7800.

The storage unit 7690 may include a read only memory (ROM) for storing various programs executed by the microcomputer, and a random access memory (RAM) for storing various parameters, calculation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may include a cellular communication protocol such as global system of mobile communications (GSM) (registered trademark), WiMAX (registered trademark), long term evolution (LTE) (registered trademark), or LTE-advanced (LTE-A), or a wireless communication protocol such as a wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 may be connected with a terminal (for example, a terminal of a driver, a pedestrian or a shop, or a machine type communication (MTC) terminal) existing in the vicinity of the vehicle, using a peer to peer (P2P) technology, for example.

The dedicated communication I/F 7630 is a communication I/F supporting a communication protocol formulated for use in the vehicle. For example, the dedicated communication I/F 7630 may include a standard protocol such as a wireless access in vehicle environment (WAVE), which is a combination of a lower layer IEEE 802.11p and an upper layer IEEE 1609, dedicated short range communications (DSRC), or a cellular communication protocol. The dedicated communication I/F 7630 typically performs V2X communication that is a concept including one or more of vehicle to vehicle communication, vehicle to infrastructure communication, vehicle to home communication, and vehicle to pedestrian communication.

The positioning unit 7640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 7640 may specify a current position by exchanging signals with a wireless access point or may acquire the position information from a terminal such as a mobile phone, a PHS, or a smartphone having a positioning function.

The beacon reception unit 7650 receives, for example, a radio wave or an electromagnetic wave transmitted from a wireless station or the like installed on a road, and acquires information such as a current position, congestion, road closure, or required time. Note that the function of the beacon reception unit 7650 may be included in the above-described dedicated communication I/F 7630.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as a wireless LAN, Bluetooth (registered trademark), near field communication (NFC), or wireless USB (WUSB). Furthermore, the in-vehicle device I/F 7660 may establish wired connection such as a universal serial bus (USB), a high-definition multimedia interface (HDMI) (registered trademark), mobile high-definition link (MHL), or the like via a connection terminal (not illustrated) (and a cable if necessary). The in-vehicle device 7760 may include, for example, at least one of a mobile device or a wearable device possessed by an occupant or an information device carried in or attached to the vehicle. Furthermore, the in-vehicle device 7760 may include a navigation device that performs a route search to an arbitrary destination. The in-vehicle device I/F 7660 exchanges control signals or data signals with these in-vehicle devices 7760.

The on-board network I/F 7680 is an interface that mediates communication between the microcomputer 7610 and the communication network 7010. The on-board network I/F 7680 transmits and receives signals and the like according to a predetermined protocol supported by the communication network 7010.

The microcomputer 7610 of the integration control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. For example, the microcomputer 7610 may calculate a control target value of the drive force generation device, the steering mechanism, or the brake device on the basis of the acquired information of the interior and the exterior of the vehicle, and output a control command to the drive system control unit 7100. For example, the microcomputer 7610 may perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle and the like. Furthermore, the microcomputer 7610 may control the drive force generation device, the steering mechanism, the braking device, or the like on the basis of the acquired information of a vicinity of the vehicle to perform cooperative control for the purpose of automatic driving of autonomous travel without depending on an operation of the driver or the like.

The microcomputer 7610 may create three-dimensional distance information between the vehicle and an object such as a peripheral structure or person and may create local map information including peripheral information of the current position of the vehicle on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. Furthermore, the microcomputer 7610 may predict danger such as a collision of the vehicle, approach of a pedestrian or the like, or entry of the pedestrian or the like into a closed road on the basis of the acquired information, and generate a warning signal. The warning signal may be, for example, a signal for generating a warning sound or for lighting a warning lamp.

The audio image output unit 7670 transmits an output signal of at least one of an audio or an image to an output device that can visually and aurally notify information to the occupant of the vehicle or outside the vehicle of information. In the example in FIG. 22, as the output device, an audio speaker 7710, a display unit 7720, and an instrument panel 7730 are exemplarily illustrated. The display unit 7720 may include, for example, at least one of an on-board display or a head-up display. The display unit 7720 may have an augmented reality (AR) display function. The output device may be a wearable device such as a headphone or a spectacular display worn by an occupant, a projector, a lamp, or the like other than the aforementioned devices. In the case where the output device is a display device, the display device visually displays a result obtained in various types of processing performed by the microcomputer 7610 or information received from another control unit, in various formats such as a text, an image, a table, and a graph. Furthermore, in the case where the output device is an audio output device, the audio output device converts an audio signal including reproduced audio data, acoustic data, or the like into an analog signal, and aurally outputs the analog signal.

Note that, in the example illustrated in FIG. 22, at least two control units connected via the communication network 7010 may be integrated as one control unit. Alternatively, an individual control unit may be configured by a plurality of control units. Moreover, the vehicle control system 7000 may include another control unit (not illustrated). Furthermore, in the above description, some or all of the functions carried out by any one of the control units may be performed by another control unit. That is, predetermined arithmetic processing may be performed by any of the control units as long as information is transmitted and received via the communication network 7010. Similarly, a sensor or a device connected to any of the control units may be connected to another control unit, and a plurality of control units may transmit and receive detection information to each other via the communication network 7010.

Note that a computer program for realizing the functions of the image processing device 11 according to the present embodiment described with reference to FIGS. 14 and 15 can be mounted in any of the control units or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium.

In the above-described vehicle control system 7000, the image processing device 11 can be applied to the integration control unit 7600 of the application example illustrated in FIG. 22. For example, each configuration of the image processing device in FIGS. 14 and 15 can be realized in the integration control unit 7600.

Furthermore, at least part of the configuration elements of the image processing device 11 described with reference to FIGS. 14 and 15 may be realized in a module (for example, an integrated circuit module configured by one die) for the integration control unit 7600 illustrated in FIG. 22. Alternatively, the image processing device 11 described with reference to FIGS. 14 and 15 may be realized by a plurality of the control units of the vehicle control system 7000 illustrated in FIG. 22.

[Combination Examples of Configurations]

The present technology may have the following configurations.

(1)

An image processing device including:

an acquisition unit configured to acquire a stereo image captured by a plurality of cameras each including a wide-angle lens;

a generation unit configured to divide viewing angles of the cameras with reference to optical axes corrected to be parallel to each other and generate a plurality of base images in each of which a range of each divided viewing angle is reflected and a plurality of reference images on the basis of wide-angle images constituting the stereo image;

a projective transformation unit configured to apply projective transformation to the reference images; and a distance calculation unit configured to calculate a distance to a predetermined object on the basis of corresponding image pairs of the plurality of base images and the plurality of reference images after projective transformation.

(2)

The image processing device according to (1), further including:

a projection unit configured to project a first wide-angle image and a second wide-angle image constituting the stereo image onto virtual spherical surfaces including the viewing angles of the cameras, respectively, in which the generation unit reprojects the first wide-angle image projected onto the virtual spherical surface onto a plurality of planes on the virtual spherical surface to generate the plurality of base images, and reprojects the second wide-angle image projected onto the virtual spherical surface onto a plurality of planes on the virtual spherical surface to generate the plurality of reference images.

(3)

The image processing device according to (1) or (2), further including:

a correction unit configured to correct the optical axis on the basis of the stereo image in which a known object is reflected; and a storage unit configured to store information regarding the optical axis after correction.

(4)

The image processing device according to (3), further including:

a parameter generation unit configured to generate a parameter to be used for projective transformation on the basis of corresponding points of the base image and the reference image constituting the image pair, in which the storage unit further stores the parameter.

(5)

The image processing device according to (4), in which the correction unit sets the optical axis after correction on the basis of information stored in the storage unit, and the projective transformation unit performs the projective transformation of the reference image on the basis of the parameter stored in the storage unit.

(6)

The image processing device according to any one of (3) to (5), in which the correction unit repeatedly performs the correction of the optical axis until a correction error becomes equal to or less than a threshold.

(7)

The image processing device according to any one of (1) to (6), in which the acquisition unit acquires wide-angle images captured by two of the cameras as the stereo image.

(8)

The image processing device according to any one of (1) to (7), further including:

the plurality of cameras.

(9)

An image processing method including the steps of:

acquiring a stereo image captured by a plurality of cameras each including a wide-angle lens;

dividing viewing angles of the cameras with reference to optical axes corrected to be parallel to each other;

generating a plurality of base images in each of which a range of each divided viewing angle is reflected and a plurality of reference images on the basis of wide-angle images constituting the stereo image;

applying projective transformation to the reference images; and calculating a distance to a predetermined object on the basis of corresponding image pairs of the plurality of base images and the plurality of reference images after projective transformation.

(10)

A program for causing a computer to execute processing including the steps of:

acquiring a stereo image captured by a plurality of cameras each including a wide-angle lens;

dividing viewing angles of the cameras with reference to optical axes corrected to be parallel to each other;

generating a plurality of base images in each of which a range of each divided viewing angle is reflected and a plurality of reference images on a basis of wide-angle images constituting the stereo image;

applying projective transformation to the reference images; and calculating a distance to a predetermined object on a basis of corresponding image pairs of the plurality of base images and the plurality of reference images after projective transformation.

REFERENCE SIGNS LIST

1 Stereo camera system
11 Image processing device
12-1, 12-2 Camera
51 Acquisition unit
52 Parallelization processing unit
53 Corresponding point search unit
54 Parameter generation unit
55 Parallelization parameter storage unit
56 Distance calculation unit
57 Post-processing unit
61-1, 61-2 Pre-processing unit
71 Optical axis detection unit
72 Virtual spherical surface projection unit
73 Optical axis correction unit
74 Plane projection unit
75 Projective transformation unit

The invention claimed is:

1. An image processing device, comprising:
an acquisition unit configured to acquire a stereo image captured by a plurality of cameras, wherein
each camera of the plurality of cameras includes a wide-angle lens, and
the stereo image includes a first wide-angle image captured by a first camera of the plurality of cameras and a second wide-angle image captured by a second camera of the plurality of cameras;
a projection unit configured to project the first wide-angle image onto a first virtual spherical surface and the second wide-angle image onto a second virtual spherical surface;
a correction unit configured to correct, based on the stereo image, an optical axis of the first camera and an optical axis of the second camera, wherein the corrected optical axis of the first camera is parallel to the corrected optical axis of the second camera;
a generation unit configured to:
divide viewing angles of the plurality of cameras with reference to the corrected optical axis of the first camera and the corrected optical axis of the second camera;
reproject the projected first wide-angle image onto a first plurality of planes that is on the first virtual spherical surface;
reproject the projected second wide-angle image onto a second plurality of planes that is on the second virtual spherical surface;
generate a plurality of base images based on the reprojection of the projected first wide-angle image onto the first plurality of planes; and
generate a plurality of reference images based on the reprojection of the projected second wide-angle image onto the second plurality of planes,
wherein each base image of the plurality of base images reflects a range of a corresponding viewing angle of the divided viewing angles;
a projective transformation unit configured to apply projective transformation to each reference image of the plurality of reference images; and
a distance calculation unit configured to calculate, after the projective transformation, a distance to a first object based on corresponding image pairs of the plurality of base images and the plurality of reference images.

2. The image processing device according to claim 1, wherein the first wide-angle image and the second wide-angle image include the viewing angles of the plurality of cameras.

3. The image processing device according to claim 1, further comprising a storage unit configured to store information regarding the corrected optical axis of the first camera and the corrected optical axis of the second camera, wherein the stereo image includes a second object.

4. The image processing device according to claim 3, further comprising a parameter generation unit configured to generate a parameter for the projective transformation, based on corresponding points of a base image of the plurality of base images and a corresponding reference image of the plurality of reference images, wherein
the base image and the corresponding reference image constitute an image pair of the corresponding image pairs, and
the storage unit is further configured to store the parameter for the projective transformation.

5. The image processing device according to claim 4, wherein
the correction unit is further configured to set the corrected optical axis of the first camera and the corrected optical axis of the second camera, based on the stored information regarding the corrected optical axis of the first camera and the corrected optical axis of the second camera, and
the projective transformation unit is further configured to apply the projective transformation to each reference image of the plurality of reference images based on the stored parameter.

6. The image processing device according to claim 3, wherein the correction unit is further configured to repeatedly correct the optical axis of the first camera and the optical axis of the second camera until a correction error becomes equal to or less than a threshold value.

7. The image processing device according to claim 1, further comprising the plurality of cameras.

8. An image processing method, comprising:
acquiring a stereo image captured by a plurality of cameras, wherein
each camera of the plurality of cameras includes a wide-angle lens, and
the stereo image includes a first wide-angle image captured by a first camera of the plurality of cameras and a second wide-angle image captured by a second camera of the plurality of cameras;
projecting the first wide-angle image onto a first virtual spherical surface and the second wide-angle image onto a second virtual spherical surface;
correcting, based on the stereo image, an optical axis of the first camera and an optical axis of the second camera,
wherein the corrected optical axis of the first camera is parallel to the corrected optical axis of the second camera;
dividing viewing angles of the plurality of cameras with reference to the corrected optical axis of the first camera and the corrected optical axis of the second camera;
reprojecting the projected first wide-angle image onto a first plurality of planes that is on the first virtual spherical surface;
reprojecting the projected second wide-angle image onto a second plurality of planes that is on the second virtual spherical surface;
generating a plurality of base images based on the reprojection of the projected first wide-angle image onto the first plurality of planes; and
generating a plurality of reference images based on the reprojection of the projected second wide-angle image onto the second plurality of planes,
wherein each base image of the plurality of base images reflects a range of a corresponding viewing angle of the divided viewing angles;
applying projective transformation to each reference image of the plurality of reference images; and
calculating, after the projective transformation, a distance to a specific object based on corresponding image pairs of the plurality of base images and the plurality of reference images.

9. A non-transitory computer-readable medium having stored thereon computer-executable instructions which, when executed by a processor, cause the processor to execute operations, the operations comprising:
acquiring a stereo image captured by a plurality of cameras, wherein
each camera of the plurality of cameras includes a wide-angle lens, and
the stereo image includes a first wide-angle image captured by a first camera of the plurality of cameras and a second wide-angle image captured by a second camera of the plurality of cameras;
projecting the first wide-angle image onto a first virtual spherical surface and the second wide-angle image onto a second virtual spherical surface;
correcting, based on the stereo image, an optical axis of the first camera and an optical axis of the second camera,
wherein the corrected optical axis of the first camera is parallel to the corrected optical axis of the second camera;

dividing viewing angles of the plurality of cameras with reference to the corrected optical axis of the first camera and the corrected optical axis of the second camera;
reprojecting the projected first wide-angle image onto a first plurality of planes that is on the first virtual spherical surface;
reprojecting the projected second wide-angle image onto a second plurality of planes that is on the second virtual spherical surface;
generating a plurality of base images based on the reprojection of the projected first wide-angle image onto the first plurality of planes; and
generating a plurality of reference images based on the reprojection of the projected second wide-angle image onto the second plurality of planes,
   wherein each base image of the plurality of base images reflects a range of a corresponding viewing angle of the divided viewing angles;
applying projective transformation to each reference image of the plurality of reference images; and
calculating, after the projective transformation, a distance to a specific object based on corresponding image pairs of the plurality of base images and the plurality of reference images.

* * * * *